United States Patent

Kato et al.

[11] Patent Number: 5,850,312
[45] Date of Patent: Dec. 15, 1998

[54] THREE-UNIT ZOOM LENS

[75] Inventors: Shigeru Kato, Tachikawa; Yuji Kamo, Hino, both of Japan

[73] Assignee: Olympus Optical Co., Ltd., Tokyo, Japan

[21] Appl. No.: 327,323

[22] Filed: Oct. 21, 1994

[30] Foreign Application Priority Data

Oct. 22, 1993 [JP] Japan .................................. 5-264827
Oct. 26, 1993 [JP] Japan .................................. 5-267283

[51] Int. Cl.$^6$ ............................ G02B 15/14; G02B 13/18
[52] U.S. Cl. ........................ 359/689; 359/684; 359/713; 359/714; 359/715
[58] Field of Search .................................. 359/689, 692, 359/684, 708, 713, 714, 715

[56] References Cited

U.S. PATENT DOCUMENTS

| | | | |
|---|---|---|---|
| 4,984,877 | 1/1991 | Ito | 359/692 |
| 5,162,947 | 11/1992 | Ito | 359/689 |
| 5,257,137 | 10/1993 | Suzuki et al. | 359/684 |
| 5,274,504 | 12/1993 | Itoh | 359/689 |
| 5,305,148 | 4/1994 | Ikamori et al. | 359/689 |
| 5,455,714 | 10/1995 | Kohno | 359/689 |
| 5,539,582 | 7/1996 | Kohno et al. | 359/689 |
| 5,572,365 | 11/1996 | Ito | 359/684 |
| 5,592,334 | 1/1997 | Oshikiri et al. | 359/684 |

FOREIGN PATENT DOCUMENTS

| | | |
|---|---|---|
| 2-10307 | 1/1990 | Japan . |
| 2-34812 | 2/1990 | Japan . |
| 5-113537 | 5/1993 | Japan . |
| 5-224122 | 9/1993 | Japan . |

Primary Examiner—Scott J. Sugarman
Attorney, Agent, or Firm—Cushman Darby Cushman IP Group of Pillsbury Madison & Sutro LLP

[57] ABSTRACT

The invention provides a zoom lens system which, albeit having a zoom ratio exceeding 2, is composed of fewer lenses, is of small and low-cost construction, and shows sufficient performance over a range from infinity to a short object distance. The three-unit zoom lens system comprises, in order from the object side, a first lens unit having very weak refracting power, a second lens unit having positive refracting power, and a third lens unit having negative refracting power with the separation between the respective lens units varied for zooming. The first lens unit includes at least one aspherical surface and each lens within the first lens unit has very weak refracting power. The three-unit lens system satisfies the following conditional formula:

$$1.65 < n_N < 1.90 \tag{1}$$

where $n_N$ is the mean value of the refractive index of the negative lens of the third lens unit.

18 Claims, 20 Drawing Sheets

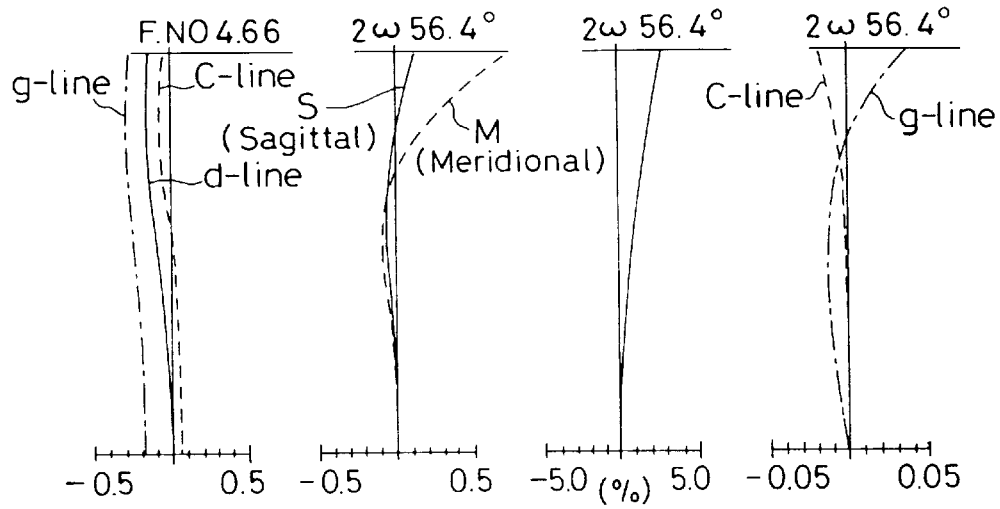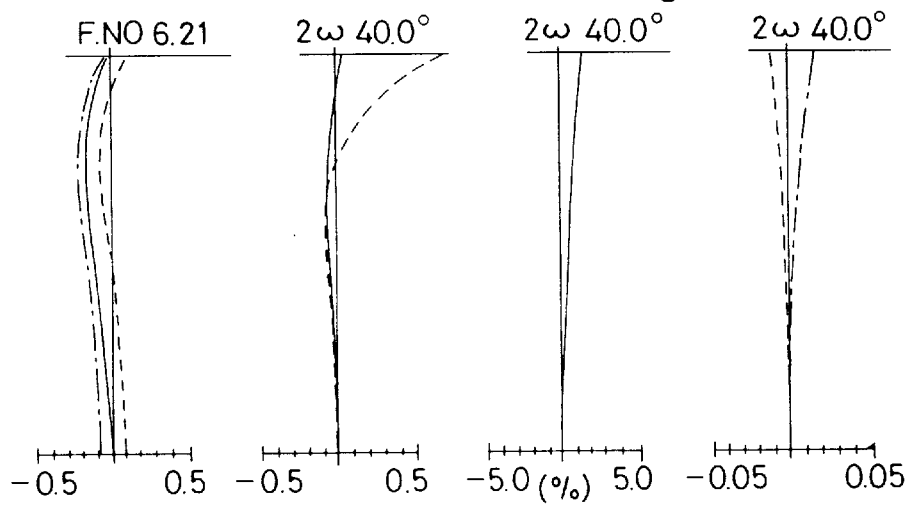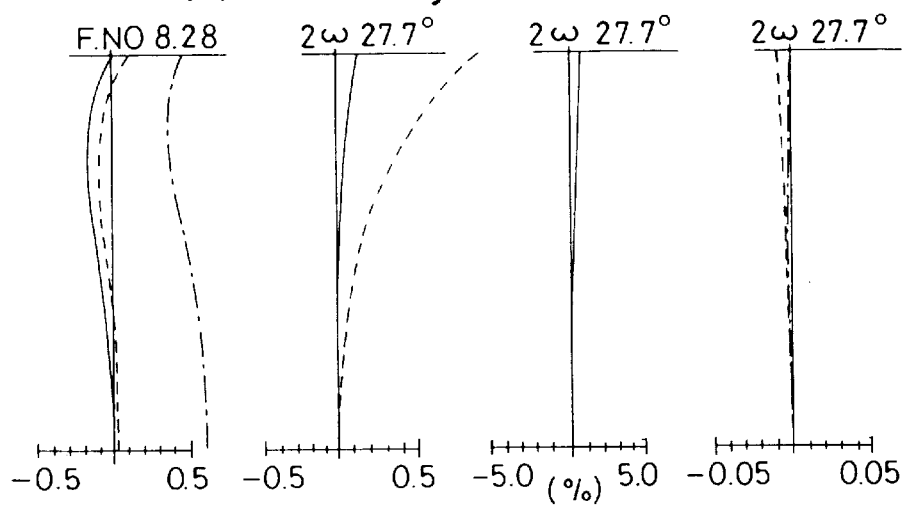

FIG. 9(a) NA 0.0044
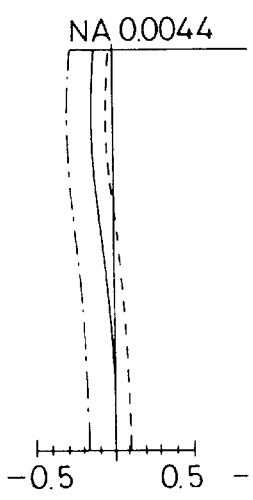
FIG. 9(b) IM.H 21.60
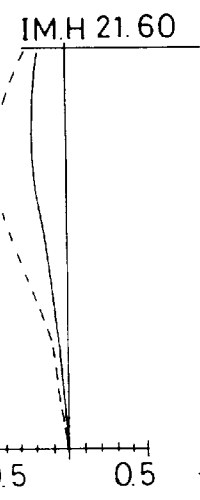
FIG. 9(c) IM.H 21.60
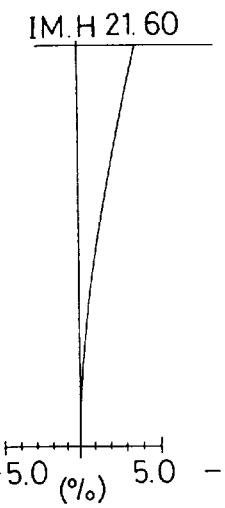
FIG. 9(d) IM.H 21.60
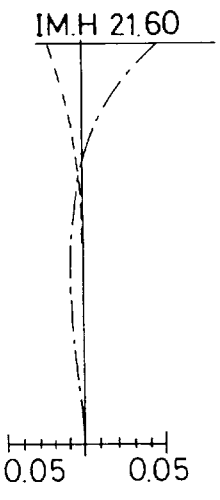
FIG. 9(e) NA 0.0049
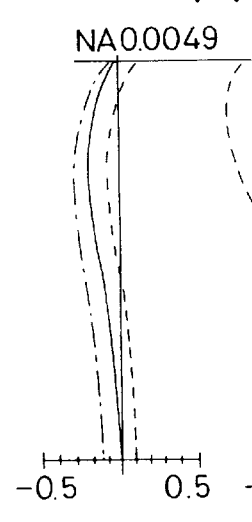
FIG. 9(f) IM.H 21.60
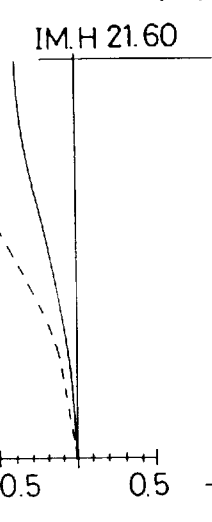
FIG. 9(g) IM.H 21.60
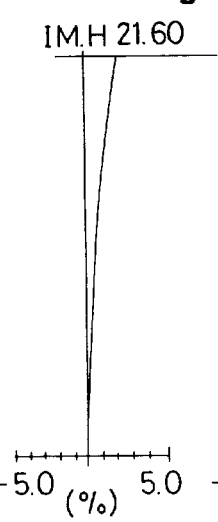
FIG. 9(h) IM.H 21.60
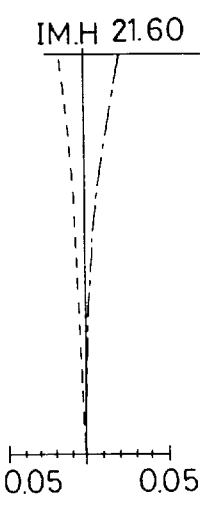
FIG. 9(i) NA 0.0056
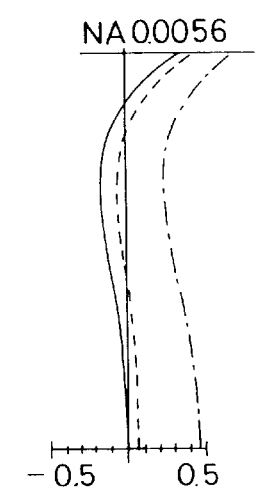
FIG. 9(j) IM.H 21.60
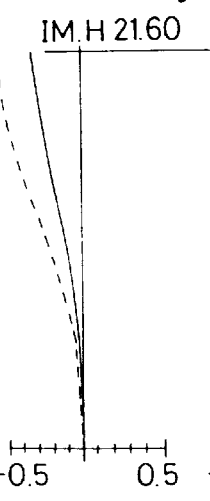
FIG. 9(k) IM.H 21.60
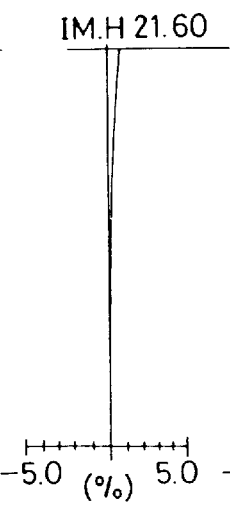
FIG. 9(l) IM.H 21.60
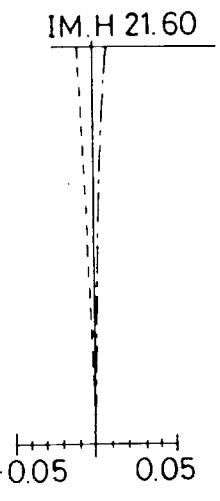

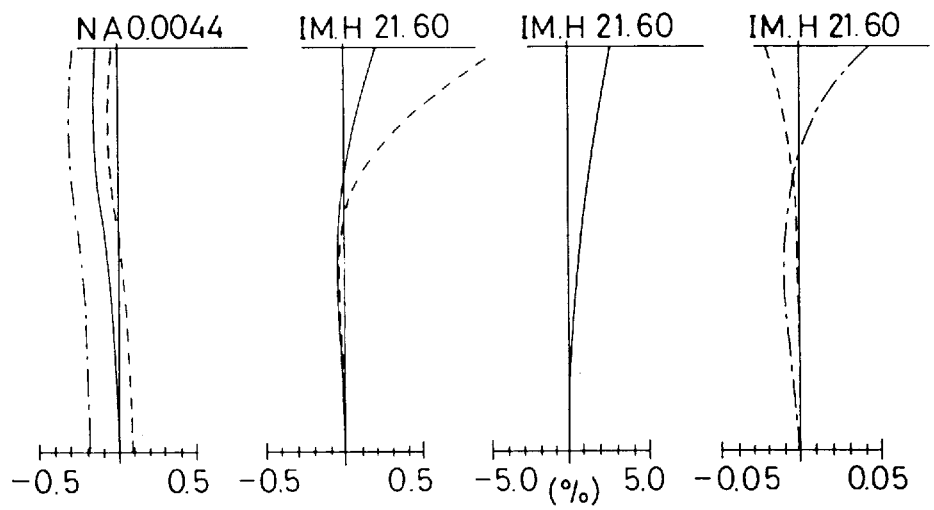
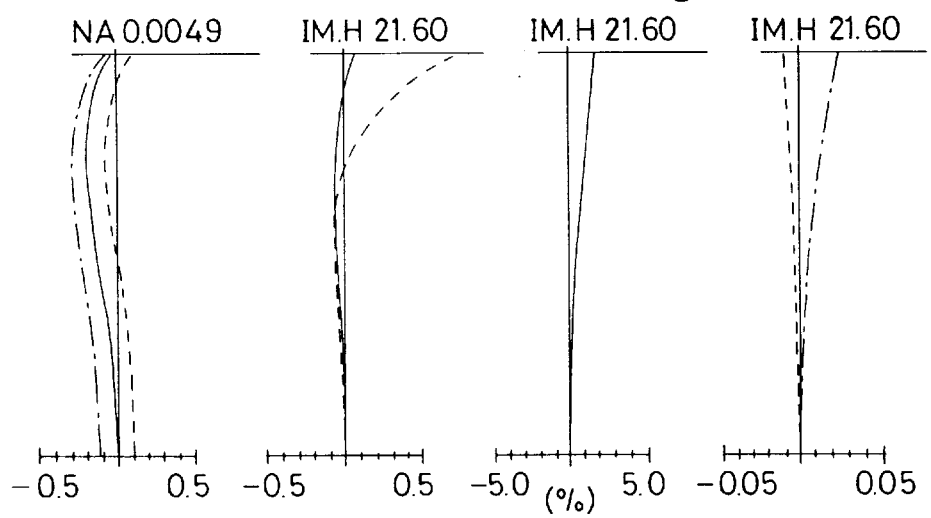
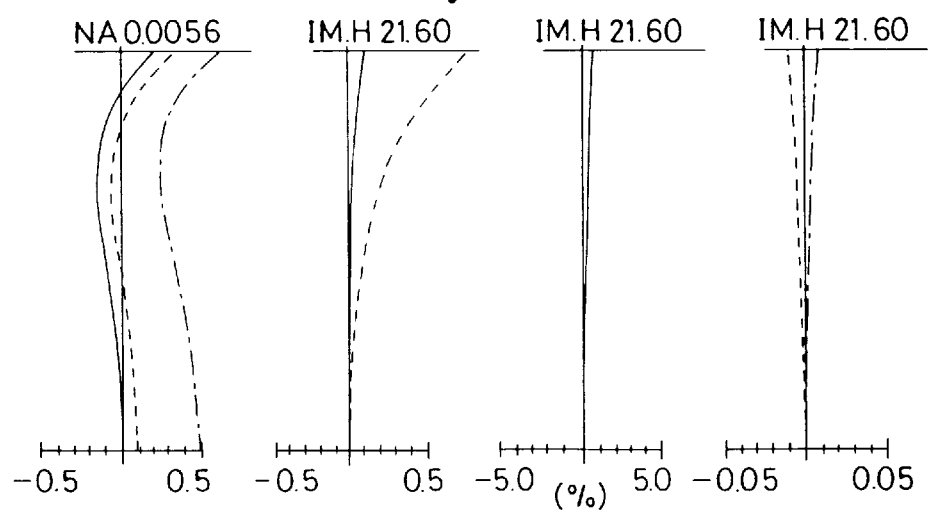

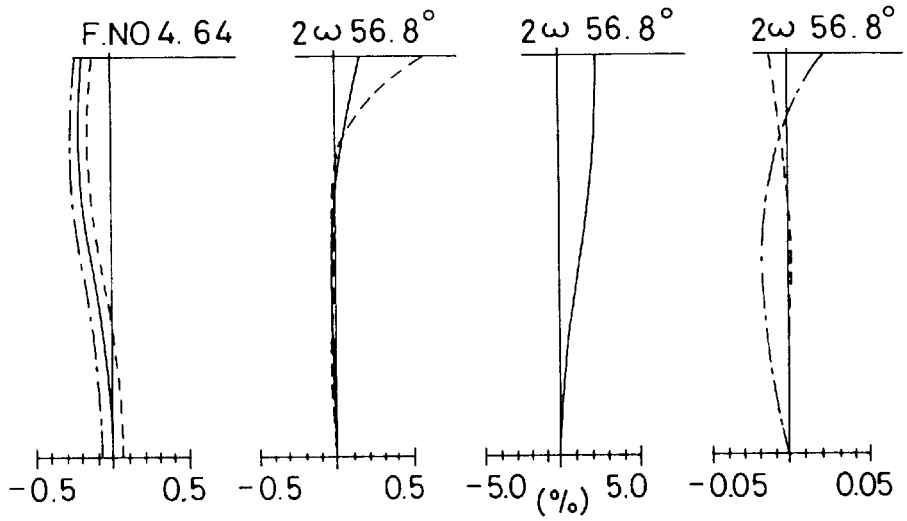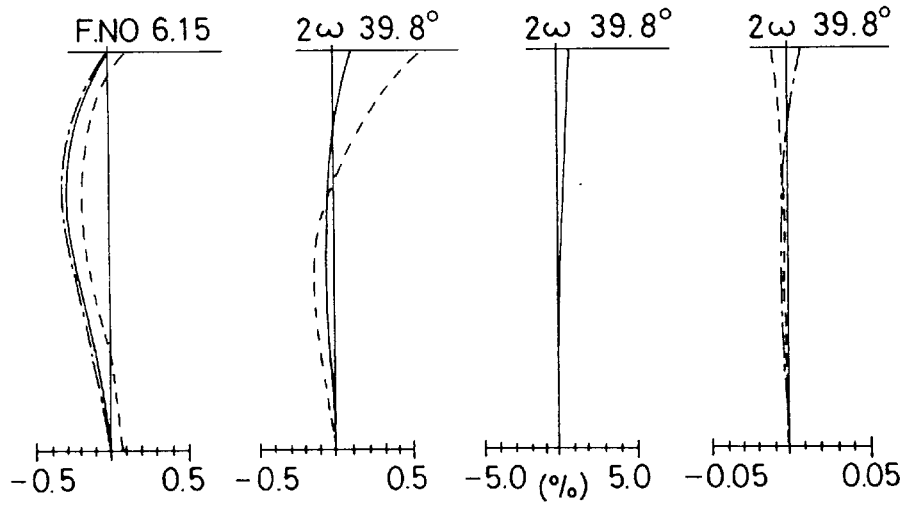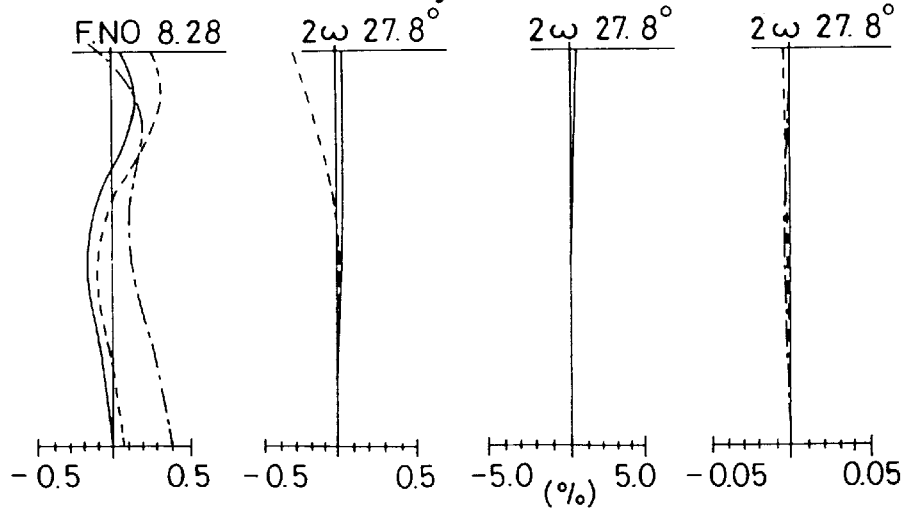

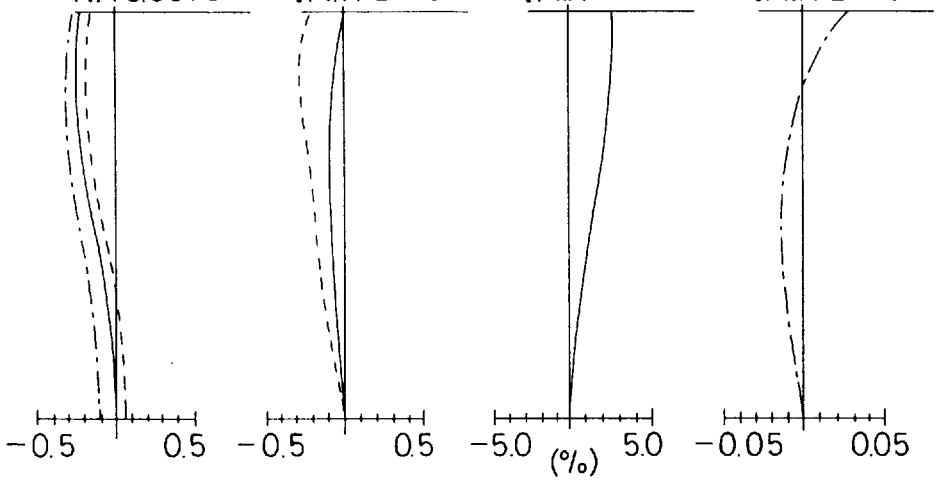
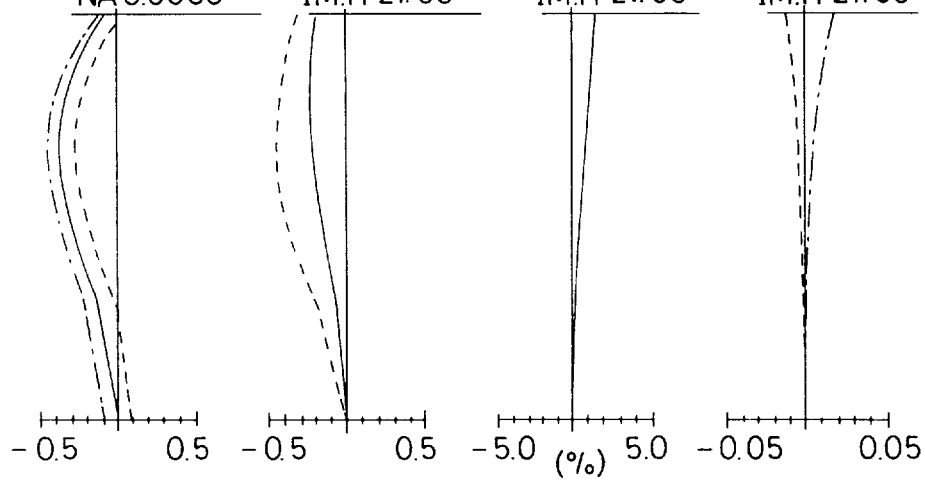
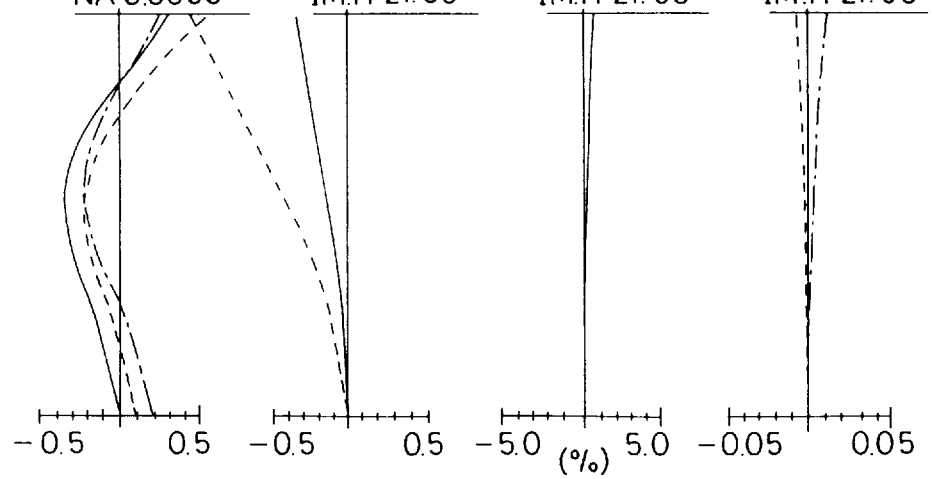

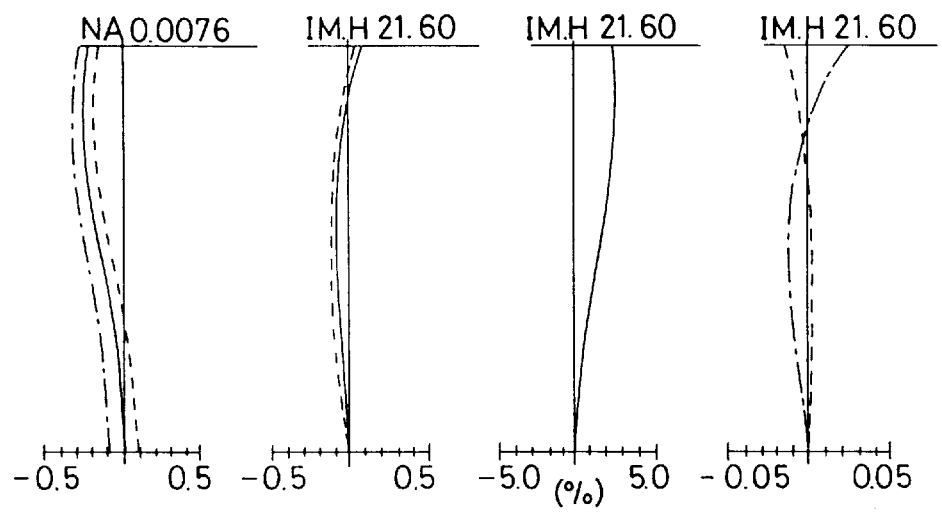

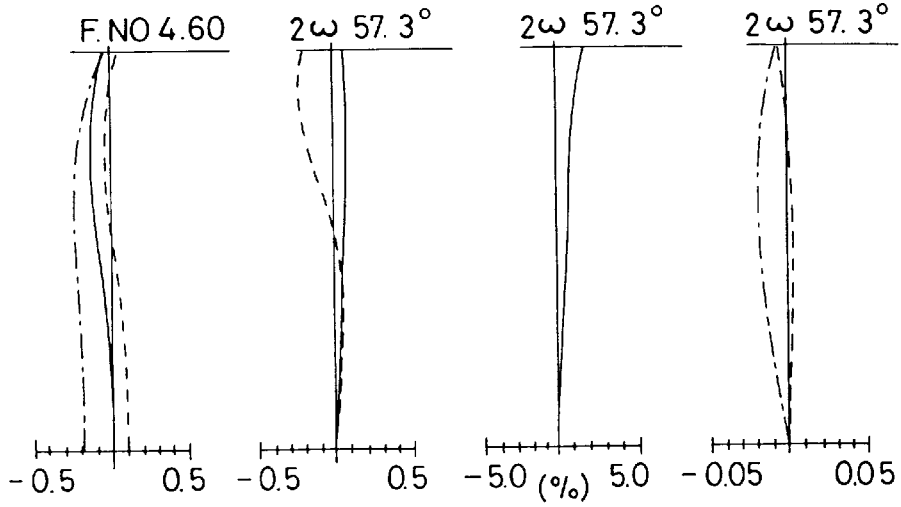
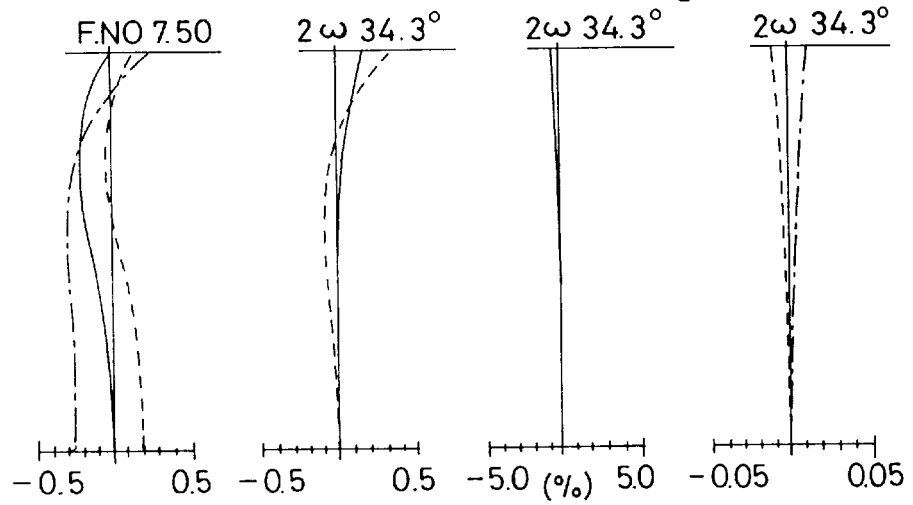
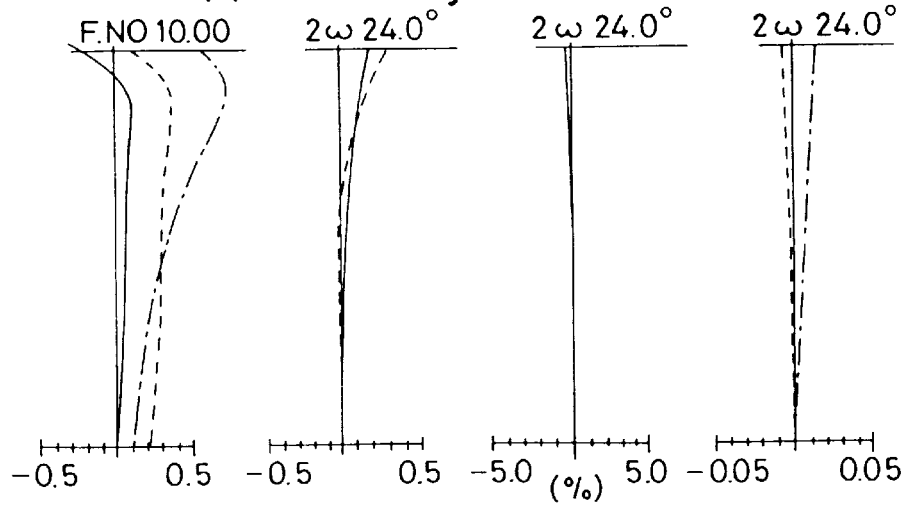

FIG.15(a)
NA 0.0044
FIG.15(b)
IM.H 21.60
FIG.15(c)
IM.H 21.60
FIG.15(d)
IM.H 21.60
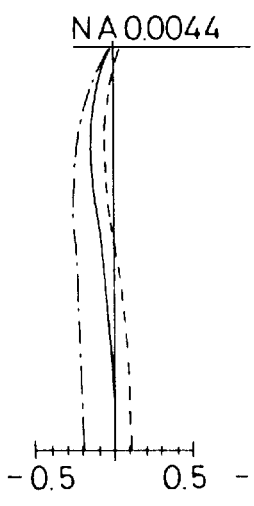
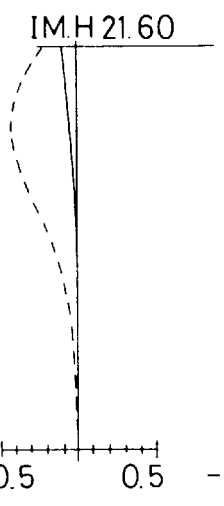
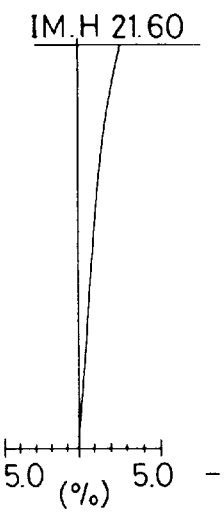
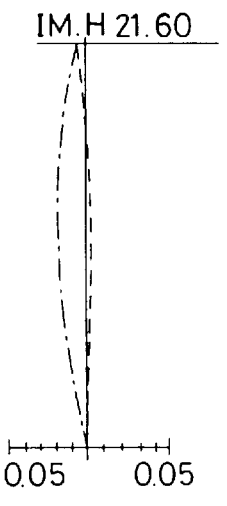
-0.5   0.5   -0.5   0.5   -5.0 (%) 5.0   -0.05   0.05
FIG.15(e)
NA 0.0050
FIG.15(f)
IM.H 21.60
FIG.15(g)
IM.H 21.60
FIG.15(h)
IM.H 21.60
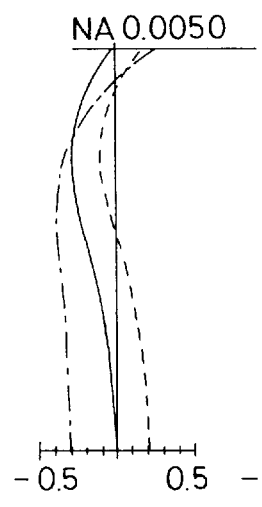
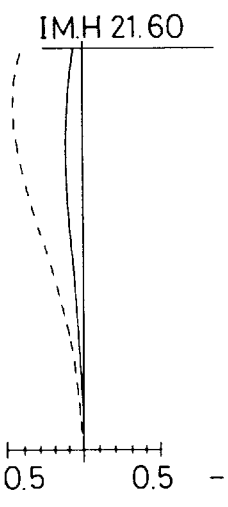
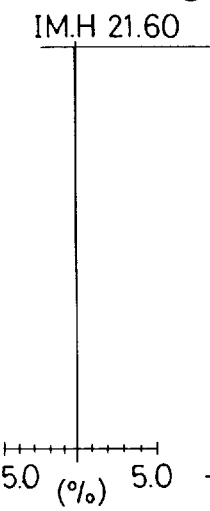
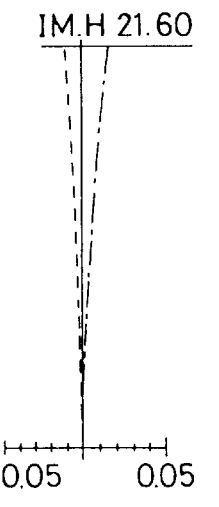
-0.5   0.5   -0.5   0.5   -5.0 (%) 5.0   -0.05   0.05
FIG.15(i)
NA 0.0057
FIG.15(j)
IM.H 21.60
FIG.15(k)
IM.H 21.60
FIG.15(l)
IM.H 21.60
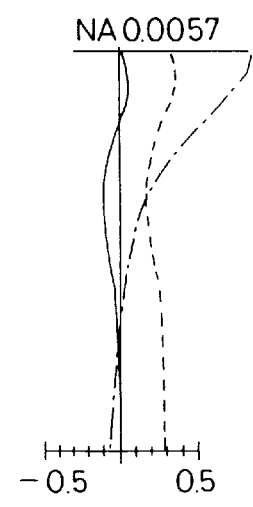
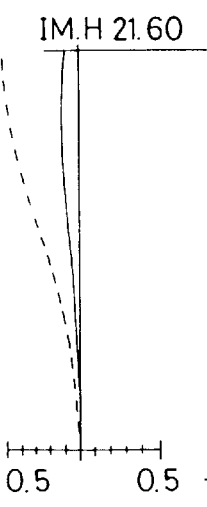
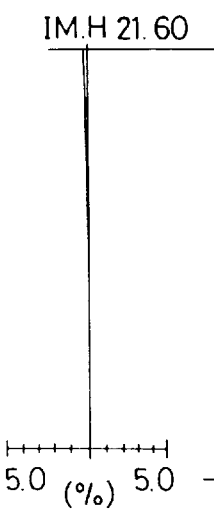
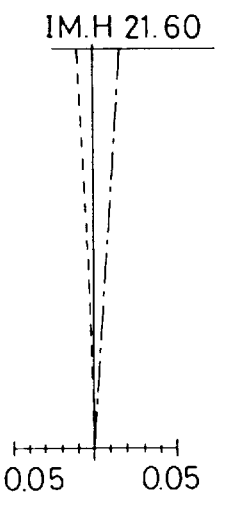
-0.5   0.5   -0.5   0.5   -5.0 (%) 5.0   -0.05   0.05

FIG.16(a) FIG.16(b) FIG.16(c) FIG.16(d)
NA 0.0076   IM.H 21.60   IM.H 21.60   IM.H 21.60
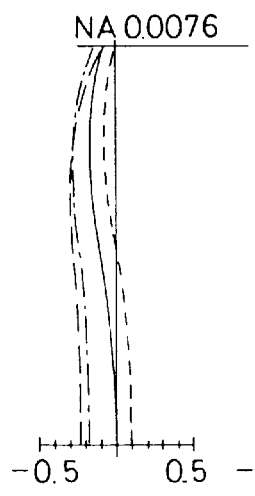 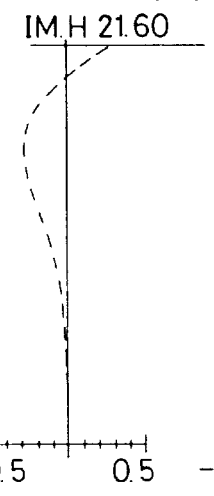 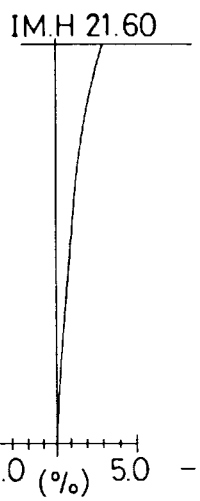 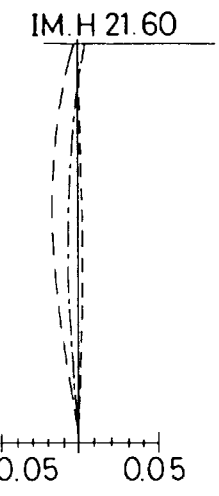
−0.5   0.5   −0.5   0.5   −5.0 (%) 5.0   −0.05   0.05
FIG.16(e) FIG.16(f) FIG.16(g) FIG.16(h)
NA 0.0088   IM.H 21.60   IM.H 21.60   IM.H 21.60
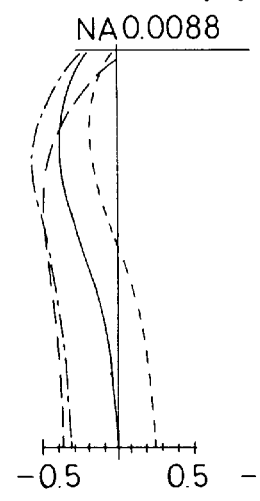 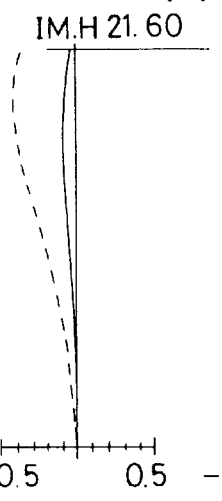 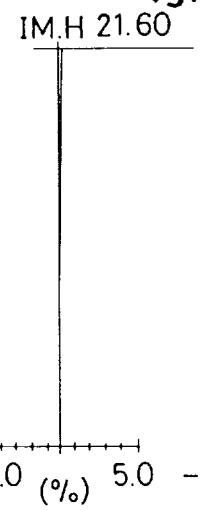 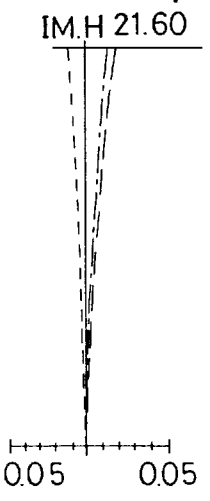
−0.5   0.5   −0.5   0.5   −5.0 (%) 5.0   −0.05   0.05
FIG.16(i) FIG.16(j) FIG.16(k) FIG.16(l)
NA 0.0102   IM.H 21.60   IM.H 21.60   IM.H 21.60
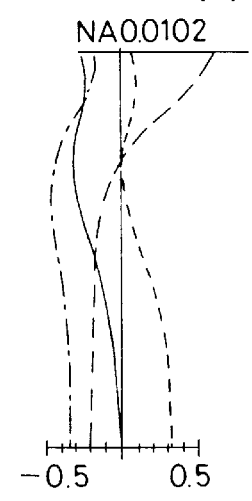 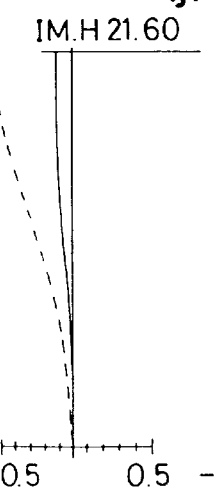 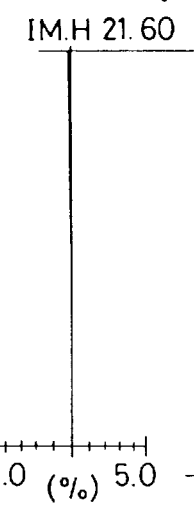 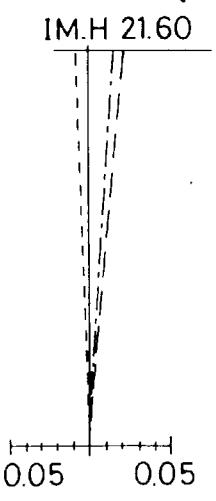
−0.5   0.5   −0.5   0.5   −5.0 (%) 5.0   −0.05   0.05

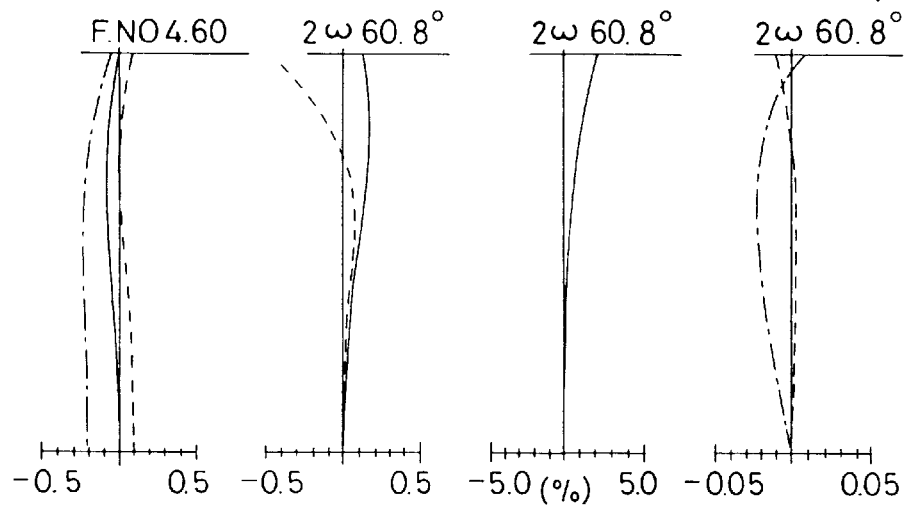

F.NO 4.60

-0.5  0.5

2ω 60.4°

-0.5  0.5

2ω 60.4°

-5.0 (%) 5.0

2ω 60.4°

-0.05  0.05

F.NO 6.10

-0.5  0.5

2ω 42.3°

-0.5  0.5

2ω 42.3°

-5.0 (%) 5.0

2ω 42.3°

-0.05  0.05

F.NO 8.28

-0.5  0.5

2ω 31.5°

-0.5  0.5

2ω 31.5°

-5.0 (%) 5.0

2ω 31.5°

-0.05  0.05

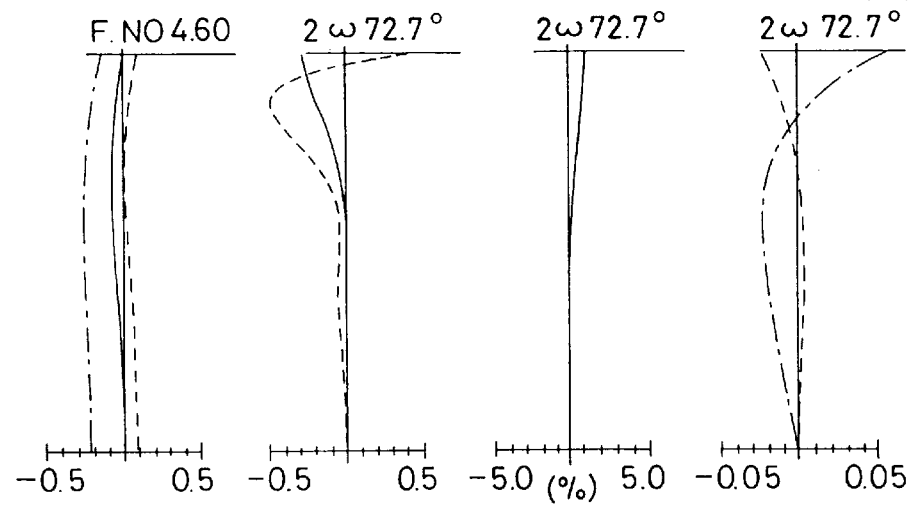

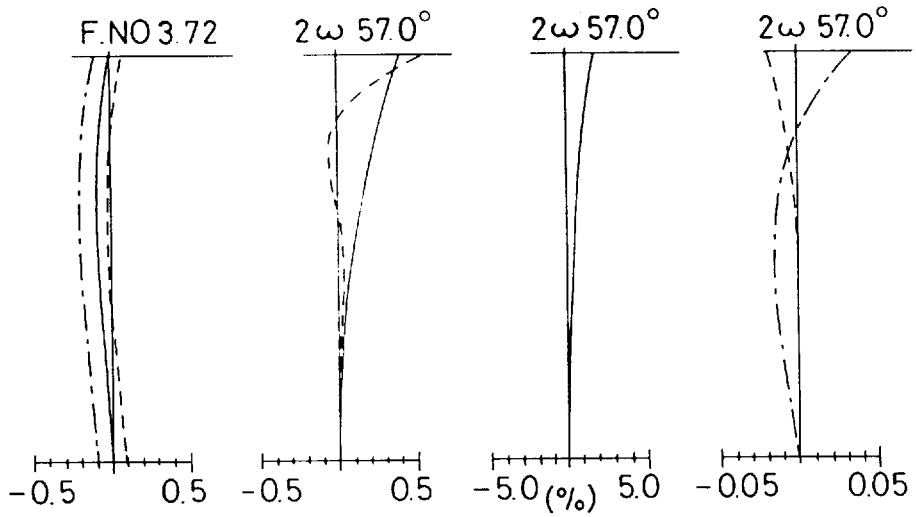
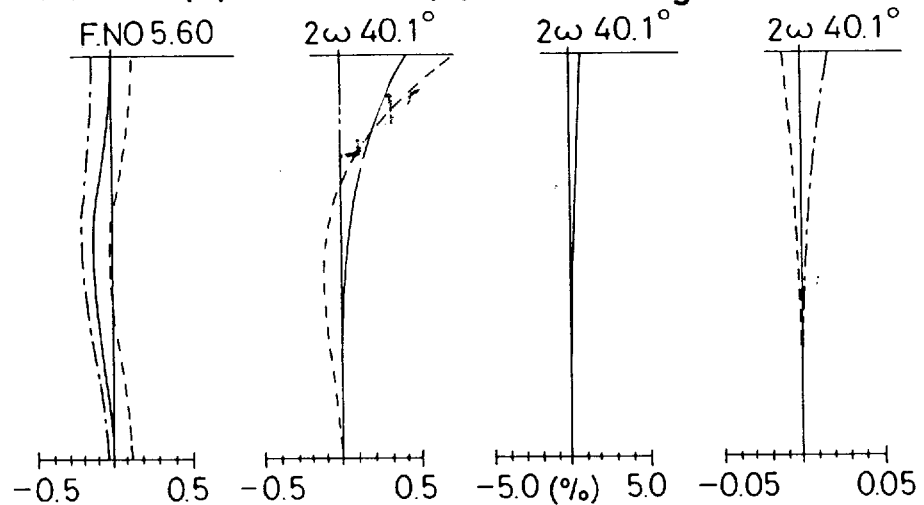
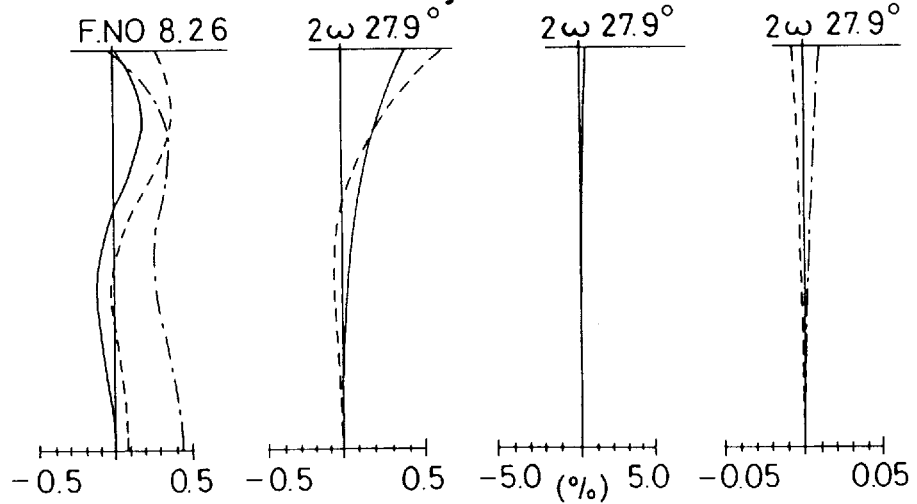

THREE-UNIT ZOOM LENS

BACKGROUND OF THE INVENTION

1. Field of the Invention

The present invention relates generally to a zoom lens well suited for use on lens shutter cameras or the like, and more particularly to a compact three-unit zoom lens system which has a zoom ratio exceeding 2 and has sufficient performance over the range from infinity to short object distances, although it is built up of fewer lenses, and is of small and low-cost construction as compared to conventional lens systems.

2. Background of Related Art

Some zoom lens systems composed of two units, i.e., positive and negative units have been known to be suitable as small and low-cost zoom lenses. However, as the number of the lens elements decreases for further size and cost reductions, satisfactory correction for aberrations of each unit becomes impossible, resulting in an increased variation of aberrations incidental to zooming. Accordingly, if one intends to make good correction for aberrations on the wide-angle and telephoto sides, then aberrations at intermediate focal lengths will become large. This tendency becomes exacerbated with an increase in the zoom ratio, and curvature of field at intermediate focal lengths in particular is under-corrected.

Another zoom type lens system for improving the curvature of field at intermediate focal lengths is known which divides the first positive lens unit into a front sub-unit having weak refracting power and a rear sub-unit having positive refracting power so that the separation between the front and rear sub-units can be varied in association with zooming, as disclosed in JP-A 2(1990)-34812.

It is well known that some considerable cost reduction is achievable by use of plastic lenses in place of glass lenses. However, the plastic lenses vary largely in terms of the index of refraction and shape depending on temperature and humidity, thus offering a problem in connection with their ability to form images. In this regard, JP-A 5(1993) 113537 has proposed a method of extremely weakening the refracting power of plastic lenses.

More recently, it has also been proposed to construct all lenses from plastics, as set forth in JP-A 5(1993)-224122.

The lens system disclosed in JP-A 2-348212 makes use of the achromatic action of a positive and negative lens combination to reduce the chromatic aberration of each unit and, hence, correct the chromatic aberration of the overall lens system. This requires the use of at least two positive and negative lenses for each unit, so making it difficult to reduce the number of the lens elements used. Plastic lenses are preferable for the purpose of cost reductions because of their strong refracting power, however, there is a large performance change due to temperature and humidity. Thus, one illustrated lens system is composed of seven units or eight lens elements, all being made of glass lenses; that is, it is still less than satisfactory in terms of cost.

A problem with the lens system set forth in JP-A 5-113537 is that difficulty is involved in obtaining sufficient performance over the entire range of the focal length, because at an increased zoom ratio there is a large variation of curvature of field incidental to zooming.

The lens system disclosed in JP-A 5-224122 is economically beneficial because of all the lens elements being made of plastics, but its performance varies largely depending on temperature and humidity. In addition, it has difficulty in canceling out chromatic aberration before and after a stop, because before the stop there is only a lens element having weak refracting power. At an increased zoom ratio in particular, there is a large variation of chromatic aberration incidental to zooming.

For a focusing mode for such a zoom type lens system comprising two positive and negative units as mentioned above, it is generally known to zoom the front lens out of the first unit.

In the zoom type lens system of two lens units, in particular a positive and a negative lens unit, there is a variation of curvature of field incidental to zooming, as mentioned above. For instance, when aberrations on the wide-angle and telephoto sides are well corrected, an under-field tilt is likely to occur at intermediate focal lengths. With the zooming-out of the front lens, however, an additional under-field tilt takes place due to a large variation of curvature of field incidental to zooming. It is thus difficult to correct the curvature of field over the entire range of the focal length when focusing is done at the shortest object distance.

As disclosed in JP-A 2-10307, sit is known that the front unit of positive refracting power is divided into two sub-units, and the sub-units are then separately zoomed out toward the object side, so that focusing can be done with a limited variation of curvature of field.

The lens system disclosed in JP-A 2-10307 is composed of a first unit with the front sub-unit consisting of at least two lenses, a positive and a negative lens, and a second unit having positive refracting power. A problem with using plastic lenses having strong refracting power in place of glass lenses for the purposes of cost reductions is that they are largely affected by temperature and humidity.

Another problem with the lens system set forth in JP-A 5-113537 is that the curvature of field at intermediate focal lengths is largely shifted to the under side, because it originally lies on the under side at infinity.

SUMMARY OF THE INVENTION

In view of conventional zoom lens systems involving such problems as mentioned above, it is an object of the present invention to provide a zoom lens system which, albeit having a zoom ratio exceeding 2, is made up of fewer lens elements, is of small and low-cost construction, and has sufficient performance over a range from infinite to short object distances.

This object is achieved by the provision of a three-unit zoom lens system which comprises, in order from the object side, a first lens unit having very weak refracting power, a second lens unit having positive refracting power, and a third lens unit having negative refracting power, and in which the separation between the respective lens units is varied for zooming, characterized in that:

the first lens unit includes at least one aspherical surface and each lens within the first lens unit has very weak refracting powers, and the three-unit zoom lens system conforms to the following conditional formula:

$$1.65 < n_N < 1.90 \qquad (1)$$

where $n_N$ is the mean value of the refractive index of the negative lens of the third lens unit.

According to the present invention, there is provided another three-unit zoom lens system which comprises, in order from the object side, a first lens unit having very weak refracting power, a second lens unit having positive refracting power, and a third lens unit having negative refracting power, and in which the separation between the respective lens units is varied for zooming, characterized in that:

the first lens unit includes at least one aspherical surface and each lens within the first lens unit has very weak refracting powers, and the second lens unit is movable along the optical axis for zooming.

In the ensuing description, a detailed account will be given of why the lens arrangements mentioned above are used and how they work.

By use of the aspherical surface, the first unit mentioned above is allowed to effectively give rise to aberrations, so that spherical aberration, coma and curvature of field derived from the second unit in particular can be well eliminated, and so the aberrations of the overall lens system can be reduced. Also, the first lens, because it is made of a powerless lens, can reduce the occurrence of chromatic aberration.

The second and third lens units have paraxial (zooming and focus-regulating) action as is the case with a conventional zoom type lens system composed of two individual lens units, in particular a positive and a negative lens unit. To reduce the total length of the lens system on the telephoto side, it is required to make the negative refracting power of the third unit strong to enhance the zooming effect and thereby reduce the amount of motion for zooming. In this case, however, it is required for keeping the image plane properties in good condition that the negative lens(es) in the third unit conform to the following condition:

$$1.65 < n_N < 1.90 \quad (1)$$

where $n_N$ is the average value of the refractive index of the negative lens of the third unit.

Unless the lower limit 1.65 of condition (1) is reached, the Petzval sum becomes negatively large, and if the upper limit of 1.90 is exceeded, the Petzval sum becomes positively large. Both cases are not preferable because of an increased astigmatism.

As is the case with a conventional zoom type of two individual lens units or a positive and a negative lens unit, it is difficult to make sufficient correction for spherical aberration, coma, curvature of field and other aberrations only by use of the second and third units, and it is difficult to make sufficient correction for these aberrations even by using aspherical surfaces for the second and third units. This is why the aspherical surface is incorporated in the first unit to make use of its effect on correcting aberrations, thereby reducing the aberrations of the overall lens system. Zooming from the wide-angle to the telephoto end is achieved by moving the second and third units having paraxial action while their separation is narrowed. At this time, however, if the first and second units are moved together, there would then be a variation of aberrations incidental to zooming. To avoid this, the separation between the first and second units is varied in association with zooming, so that the aberrational balance can be varied to reduce the variation of aberrations incidental to zooming.

Since the second and third units have strong refracting power, they cannot make sufficient correction for chromatic aberration, if they are composed of fewer lenses. By locating a stop between these two units, however, it is possible to reduce their chromatic aberrations as a whole, because the chromatic aberrations of magnification of both units are reversed and so canceled out. Of course, it is desired to correct longitudinal chromatic aberration and chromatic aberration of magnification by the incorporation in both units of at least a negative and a positive lens, because single lens arrangements result in the occurrence of an increased chromatic aberration. This is preferable especially when the zoom ratio is large, because the variation of chromatic aberration during zooming is further reduced by allowing the chromatic aberration to be corrected within each unit.

Hence, it is desired to conform to the following conditional formula:

$$1.65 < n_N' < 1.90 \quad (1')$$

$$|vdP - vdN| < 10 \quad (2)$$

where $n_N'$ is the mean value of the refractive index of the negative lens of the second and third lens units, vdP is the mean value of the Abbe's number of the positive lens elements of the second or third lens unit, and vdN is the mean value of the Abbe's number of the negative lens of the second or third lens unit.

When there is a departure from condition (2) requirement of less than 10, the chromatic aberration derived from the second or third unit becomes large; and thus there is an increased chromatic aberration incidental to zooming. Condition (1') has substantially the same meanings as condition (1).

It is also desired for the first unit to satisfy the following conditional formula:

$$|f_T/f_1| < 0.1 \quad (3)$$

where $f_T$ is the focal length of the overall system at the telephoto end, and $f_1$ is the focal length of each lens within the first unit.

When there is a departure form condition (3) requirement of more than 0.1, more chromatic aberration is derived from the first unit, and so the overall chromatic aberration becomes worse.

If condition (3) is satisfied, the first unit can be composed of plastic lenses, which are less expensive than glass lenses, and has another advantage in that the influence on the image-forming ability can be reduced to a minimum. This is because there is no substantial change in the refracting power of the lenses, even when the refractive indices and shape of the lenses change due to temperature and humidity. This first unit has still another advantage in that the chromatic aberration thereof can be sufficiently reduced even without recourse to conventional achromatization with two or more positive and negative lenses.

In view of the mechanism for the lens frame, the zoom lens system according to the present invention is a three type zoom lens system, but the mechanism for moving the lens frame can be made smaller than that for a conventional three unit zoom type, because the first and second units are allowed to move substantially together. For this reason, the zoom lens system of the invention preferably satisfies the following conditional formula:

$$|\Delta D_1/\Delta D_2| < 0-5 \quad (4)$$

where $\Delta D1$ is the maximum of the amount of change in the separation between the first and second units, and $\Delta D_2$ is the maximum of the amount of change in the separation between the second and third units.

With the upper limit 0.5 of condition (4) exceeded, there is an increase in the amount of change in the separation between the first and second units, resulting in a size increase in the lens frame mechanism.

In the lens arrangement according to the present invention, the distance from the pupil location to the incident and exit lens surfaces is short, because the length of the arrangement is equal to, or shorter than, that of a conventional two-unit zoom type. This allows the heights of marginal rays on the incident and exit surfaces to remain low and hence the lens diameter to remain small.

During focusing, the aberrations of the composite set of the first and second units and the third unit are ill balanced, and so an under field tilt occurs. To alter the occurrence of curvature of field, therefore, the separation between the first and second units is varied in association with focusing, as is the case with zooming. In other words, the first and second units are independently moved on the optical axis, whereby some considerable improvement is introduced in the curvature of field.

An under curvature of field, when occurring in the second unit, is over-corrected by the aspherical surface of the first unit. Zooming-out of the first and second units gives rise to an additional under curvature of field, but this is allowed to return in the over direction by widening the separation between the first and second units, so that the overall curvature of field can be reduced.

In a three-unit zoom lens design there is a limited variation of the curvature of field incidental to zooming at infinity. In other words, even when the first and second units are moved together for focusing, the performance of the three-unit zoom type does not become worse so much as a conventional type composed of two individual lens units, in particular a positive and a negative lens unit. Thus, the three-unit zoom type lens system is advantageous in that the focusing mechanism can be simplified, although the shortest object distance is not appreciably reduced.

By use of an aspherical surface for the second unit it is possible to extremely reduce the occurrence of aberrations by the second unit. In particular, it is possible to shift the occurrence of curvature of field from the under to the over side, with the occurrence of curvature of field by the first unit shifted to the reverse mentioned above. In this case the curvature of field is shifted to the over side with a decrease in the separation between the first and second units. This means that after the first and second units have been zoomed out, the first unit is zoomed in for correction for the curvature of field. Consequently, there is a limited variation of the curvature of field, even when focusing is done only by use of the second unit. This focusing mode is preferable, because it enables focusing to be done with one focusing unit and hence the focusing mechanism to be simplified to a minimum.

Preferably, the relation between the amounts $\Delta G_1$ and $\Delta G_2$ of movement of the first and second units for focusing conforms to the following conditional formula:

$$-1 < \Delta G_1 / \Delta G_2 < 2 \tag{5}$$

Any departure from the range defined by condition (5) is not preferable, because the curvature of field remains over-corrected. At less than the lower limit of −1 the incident surface goes away from the stop during focusing at infinity, and so the heights of marginal rays are increased, resulting in an increase in lens diameter. At more than the upper limit of 2 the incident surface goes away from the stop during focusing at the shortest object distance, again resulting an increase in lens diameter.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the accompanying claims.

BRIEF DESCRIPTION OF THE DRAWINGS

FIGS. 9(a) to 9(l) are an aberration diagrams of Example 1 during focusing at 1 m by the integral zooming-out of the first and second units, which is similar to that of FIGS. 8(a) to 8(l), FIGS. 10(a) to 10(l) are aberration diagrams of Example 1 during focusing at 0.6 m by the independent zooming-out of the first and second units, which is similar to that of FIGS. 8(a) to 8(l), FIGS. 11(a) to 11(l) are aberration diagrams of Example 2 during focusing at infinity, which is similar to that of FIGS. 8(a) to 8(l), FIGS. 12(a) to 12(l) are aberration diagrams of Example 2 during focusing at 0.6 m by the zooming-out of the second unit, which is similar to that of FIGS. 8(a) to 8(l), FIGS. 13(a) to 13(l) are aberration diagrams of Example 2 during focusing at 0.6 m by the zooming-in of the first unit and the zooming-out of the second unit, which is similar to that of FIGS. 8(a) to 8(l), FIGS. 14(a) to 14(k) are aberration diagrams of Example 3 during focusing at infinity, which is similar to that of FIGS. 8(a) to 8(l), FIGS. 15(a) to 15(l) are aberration diagrams of Example 3 during focusing at 1 m by the integral zooming-out of the first and second units, which is similar to that of FIGS. 8(a) to 8(l), FIGS. 16(a) to 16(l) are aberration diagrams of Example 3 during focusing at 0.6 m by the independent zooming-out of the first and second units, which is similar to that of FIGS. 8(a) to 8(l), FIG. 17 is an aberration diagram of Example 4 during focusing at infinity, which is similar to that of FIGS. 8(a) to 8(l), FIG. 19 is an aberration diagram of Example 6 during focusing at infinity, which is similar to that of FIGS. 8(a) to 8(l), and FIG. 20 is an aberration diagram of Example 7 during focusing at infinity, which is similar to that of FIGS. 8(a) to 8(l).

DESCRIPTION OF THE PREFERRED EMBODIMENTS

In the following description, an account will be given of Examples 1–7 of the zoom lens system according the present invention. Of these, Examples 1–3 will also be explained in terms of focusing.

Lens data about each example will be given later.

Figure 1A:
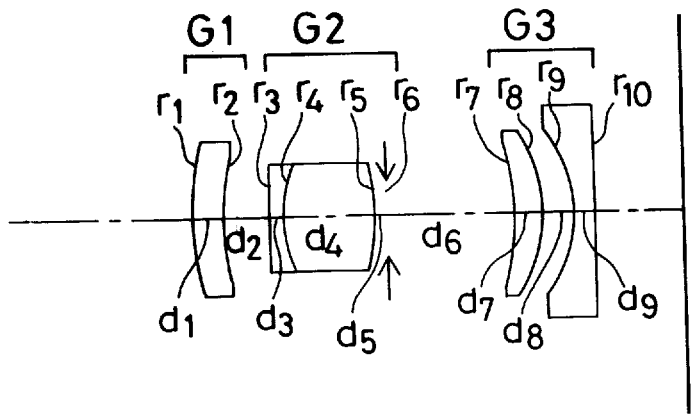
FIGS. 1(a) to 1(c) are sectional views of a three-unit zoom lens system of Example 1 according to the present invention during focusing at infinity, which are shown at the wide-angle end (FIG. 1(a)), intermediate focal length setting (FIG. 1(b)), and telephoto end (FIG. 1(c))
Figure 1B:
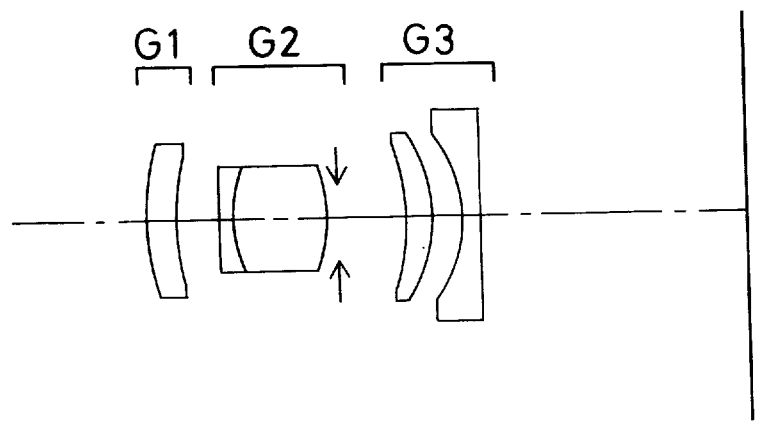
Figure 1C:
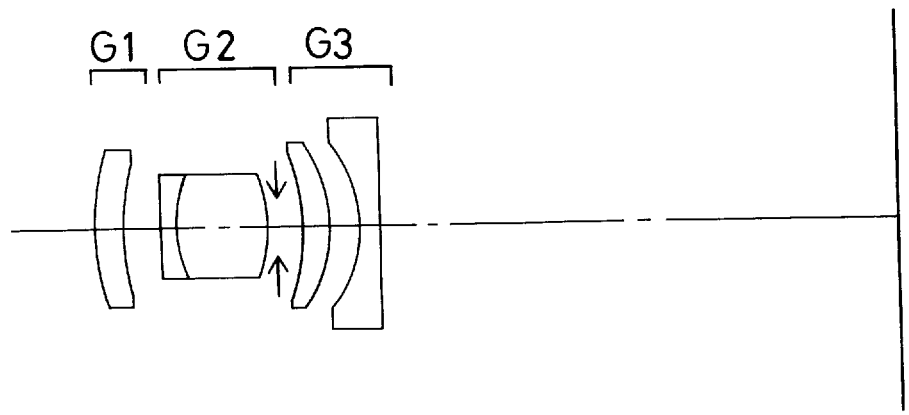
Figure 2A:
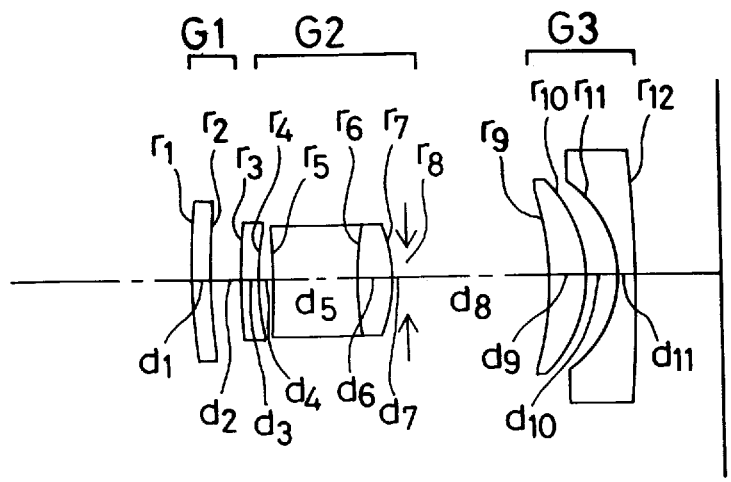
FIGS. 2(a) to 2(c) are sectional views of a lens system of Example 2 that are similar to those of FIGS. 1(a) to 1(c), FIGS. 3(a) to 3(c) are sectional views of a lens system of Example 3 that are similar to those of FIGS. 1(a) to 1(c), FIGS. 4(a) and 4(b) are sectional views of a lens system of Example 4 at the wide-angle end ((FIG. 4(a)) and telephoto end (FIG. 4(b),)
Figure 2B:
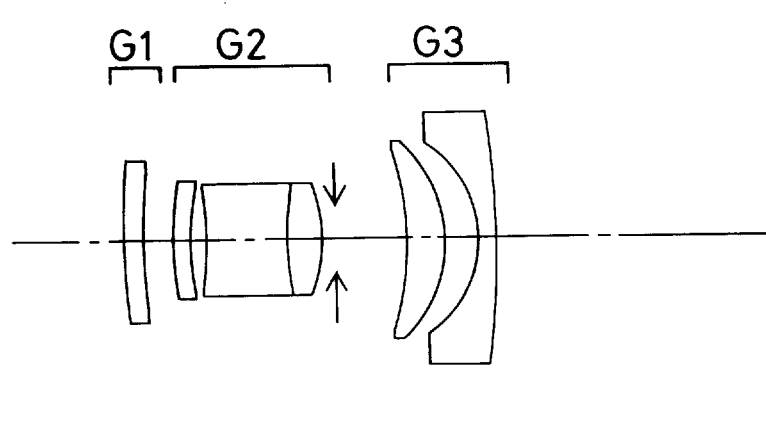
Figure 2C:
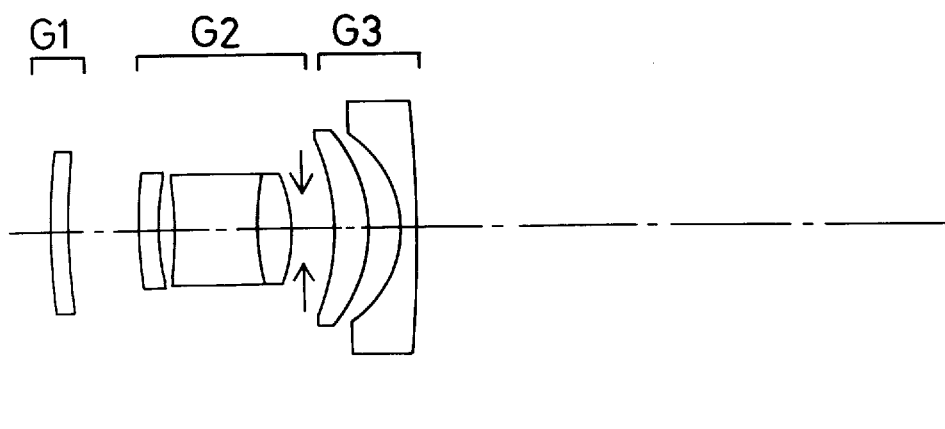
Figure 3A:
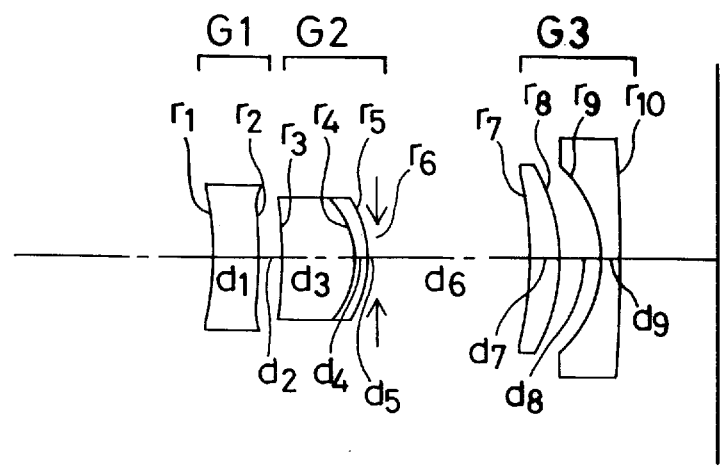
Figure 3B:
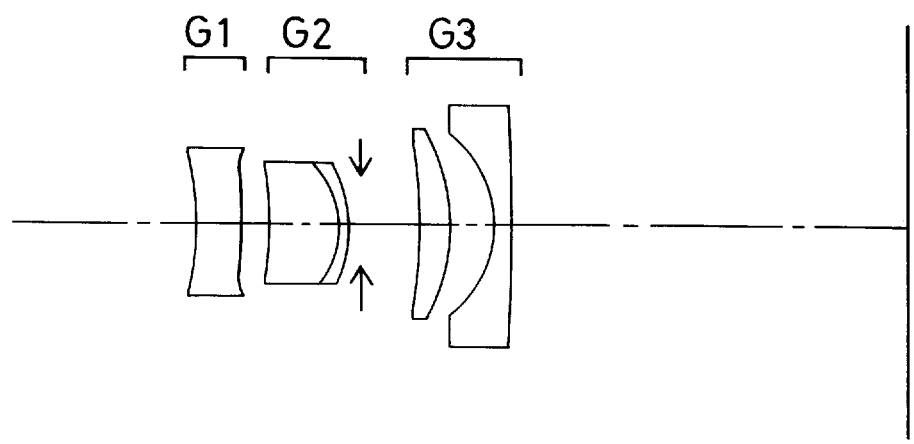
Figure 3C:
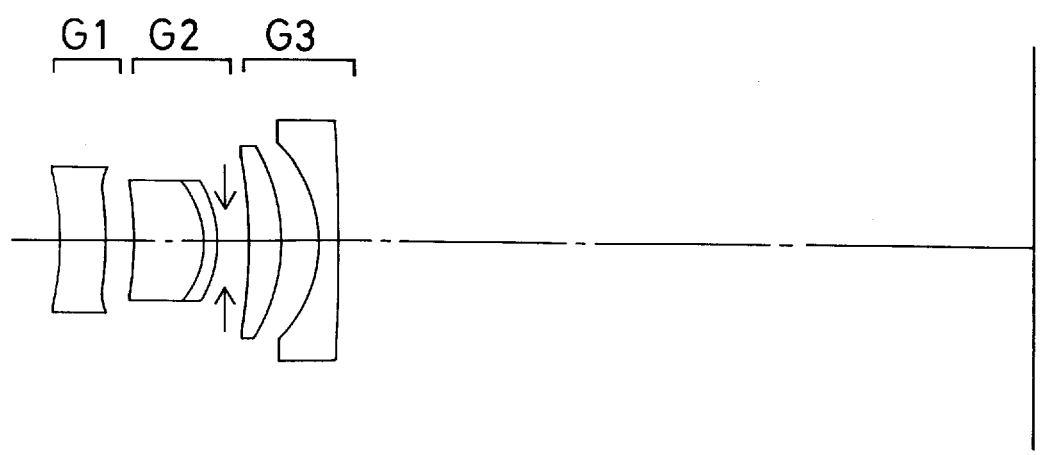
Figure 4:
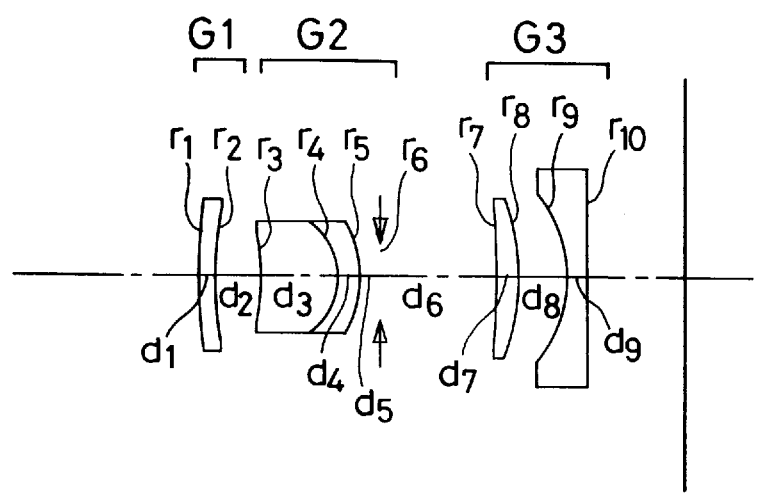
Figure 4:
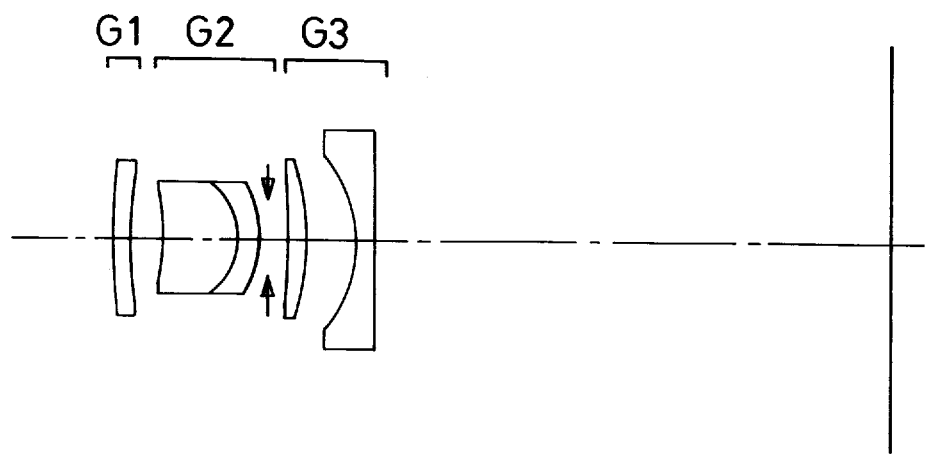
Figure 5:
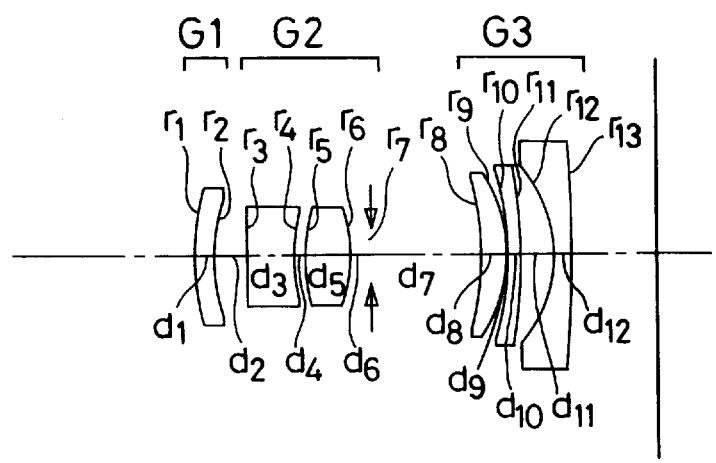
FIGS. 5a and 5(b) are sectional views of a lens system of Example 5 that are similar to those of FIGS. 4(a) and 4(b), FIGS. 6(a) and 6(b) are sectional views of a lens system of Example 6 that are similar to those of FIGS. 4(a) and 4(b), FIGS. 7(a) and 7(b) are sectional views of a lens system of Example 7 that are similar to those of FIGS. 4(a) and 4(b), FIGS. 8(a) to 8(l) are an aberration diagram showing the spherical aberration, astigmatism, distortion, and chromatic aberration of magnification of Example 1 at the wide-angle end, intermediate focal length setting, and telephoto end during focusing at infinity.
Figure 5:
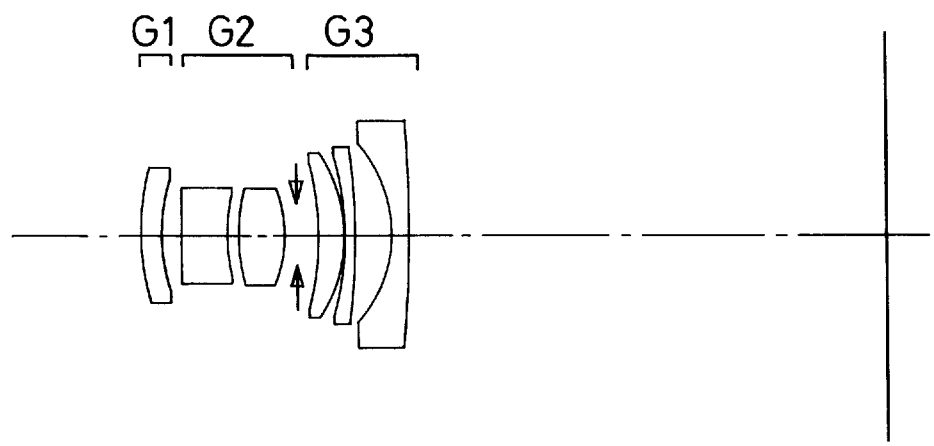
Figure 6:
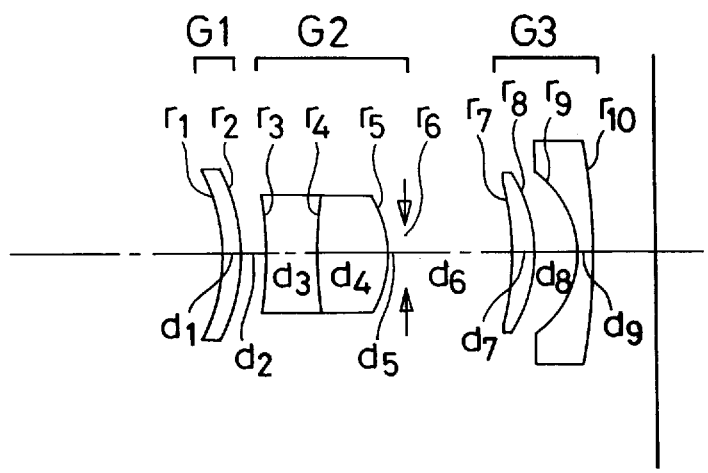
Figure 6:
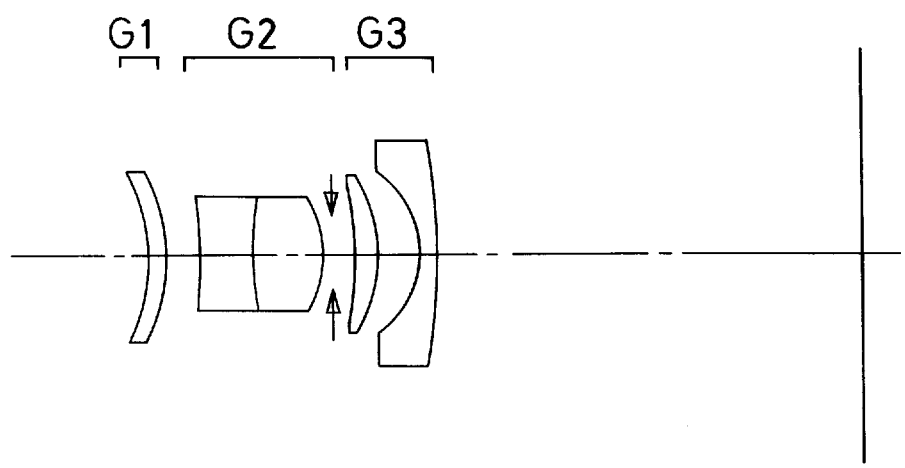
Figure 7:
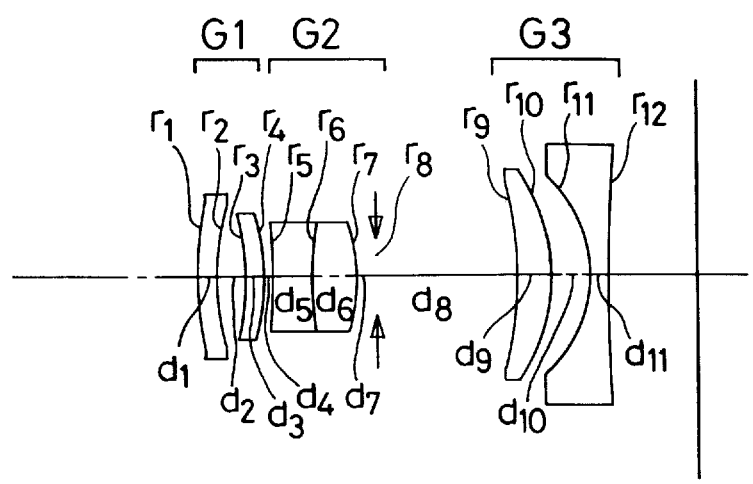
Figure 7:
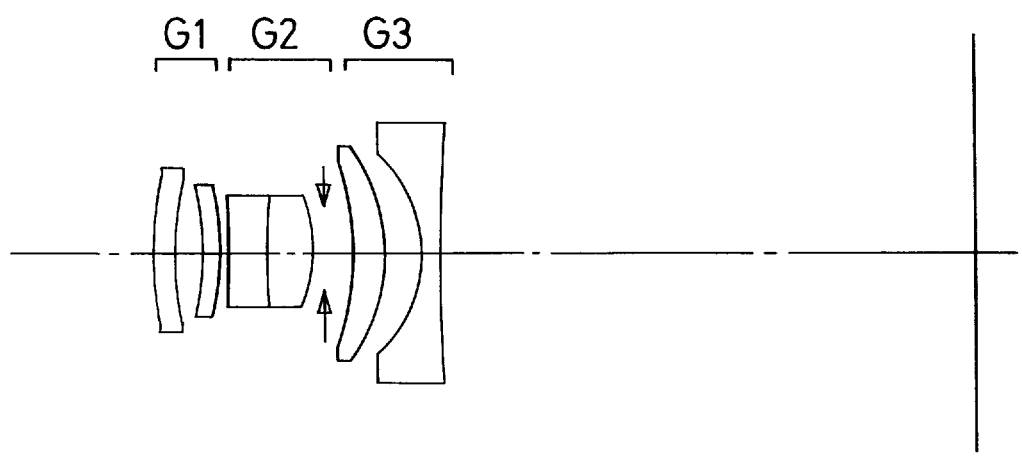
Figure 18A:
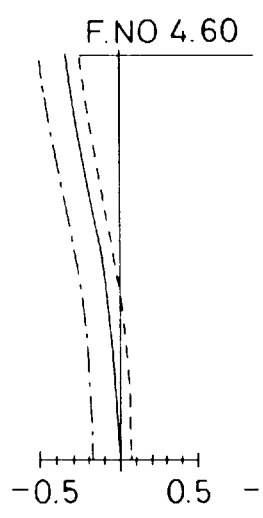
FIG. 18 is an aberration diagram of Example 5 during focusing at infinity, which is similar to that of FIGS. 8(a) to 8(l)
Figure 18B:
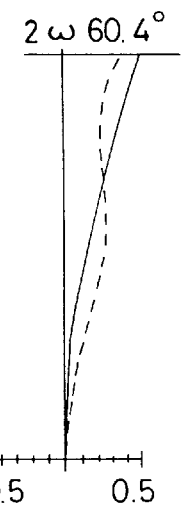
Figure 18C:
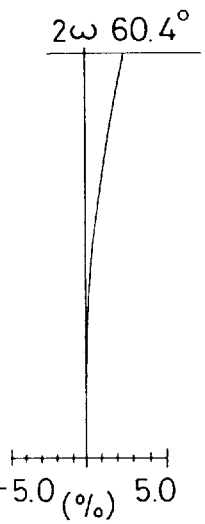
Figure 18D:
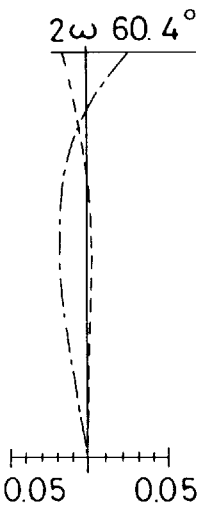
Figure 18E:
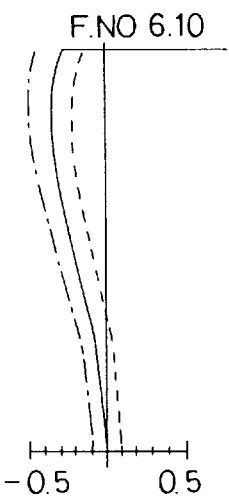
Figure 18F:
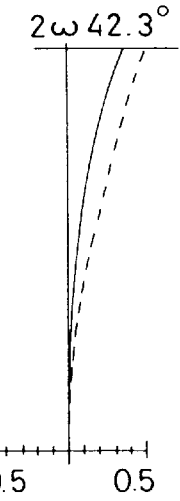
Figure 18G:
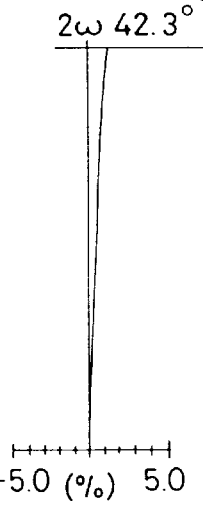
Figure 18H:
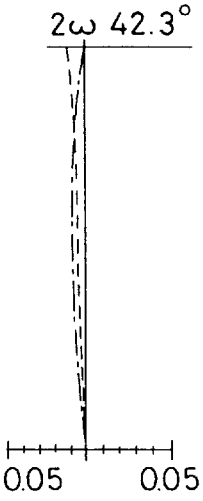
Figure 18I:
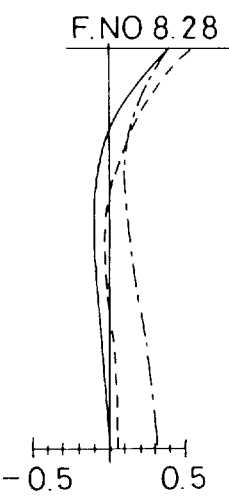
Figure 18J:
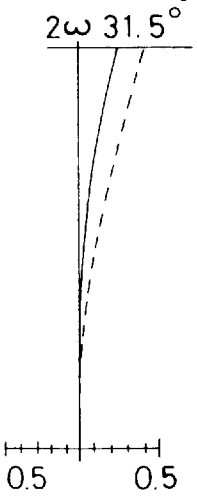
Figure 18K:
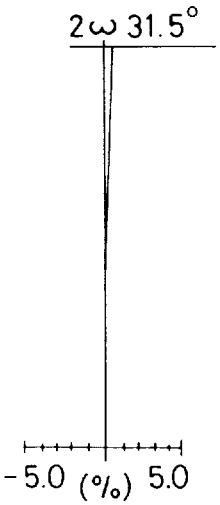
Figure 18L:
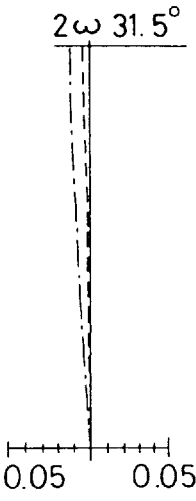

Presented in FIGS. 1(a) to 3(c) are sectional views of the lens systems of Examples 1–3 at the wide-angle ends (FIGS. 1(a), 2(a) and 3(a)), intermediate focal length settings (FIGS. 1(b), 2(b) and 3(b)), and telephoto ends (FIGS. 1(c), 2(c) and 3(c)), and presented in FIGS. 4(a) to 7(b) are sectional views of the lens systems of Examples 4–7 at the wide-angle ends (FIGS. 4(a), 5(a), 6(a) and 7(a)) and telephoto ends (FIGS. 4(b), 5(b), 6(b) and 7(b)).

In Example 1 the lens arrangement comprises, in order from the object side, a first unit G1 consisting of a plastic lens having very weak refracting power, a second unit G2 consisting of a cemented positive lens of a negative and a positive lens, and a third unit G3 having negative refracting power and consisting of a positive and a negative lens; five in all, and each of the first and third units G1 and G3 includes an aspherical surface. Especially because the aspherical surface forms the incident surface of the first unit G1 on which central rays are separated from marginal rays, variations of peripheral curvature of field and coma are well corrected. In particular, under curvature of field is introduced by the second unit G2. However, since the shape of the aspherical surface of the first unit G1 is designed in such a way that its positive refracting power becomes weak as it goes away from the optical axis, over curvature of field occurs so that the curvature of field by the first and second units G1 and G2 can be reduced.

Since zooming takes place while the separation between the first and second units G1 and G2 changes simultaneously with a decrease in the separation between the second and third units G2 and G3, curvature of field can be reduced at intermediate focal lengths.

Focusing may be done by the integral zooming-out of the first and second units G1 and G2 (FIGS. 9(a) to 9(l)). To reduce the shortest object distance, however, it is desired that both the units be zoomed out while the separation between them is made wide (FIGS. 10(a) to 10(l)). In this case, if the amounts of movement of the first and second units G1 and G2 remain at a fixed ratio, it is then possible to simplify the zooming-out control mechanism while the image-forming ability is kept good.

In Example 1 it is understood that an aspherical surface may be used for the glass lens provided in the second unit G2, especially for the surface of the second unit G2 proximate to the object side. In this example, focusing can be carried out by the zooming-out of the second unit G2 alone, because aberration performance can be improved by using the aspherical surface for the glass lens of the second unit G2. Thus, Example 1 has the advantages of simplified construction and cost reductions.

In Example 2 the lens arrangement comprises, in order from the object side, a first unit G1 consisting of a plastic lens having very weak refracting power, a second unit G2 consisting of a cemented positive lens of a negative and a positive lens, and a third unit G3 consisting of a positive and a negative lens and having negative refracting power; six in all, and each unit includes an aspherical surface. The plastic lens in the second unit G2 is an aspherical lens, which is powerless so as to reduce performance degradation due to temperature and humidity. The effect of this aspherical surface on correction for aberrations enables aberrations by the second unit G2 to be much more reduced than those in Example 1, especially with a slight over curvature of field. On the other hand, the shape of the aspherical surface in the first unit G1 is designed in such a way that its positive refracting power becomes strong as it goes away from the optical axis, so that under curvature of field can occur. However, both the units are small in terms of the magnitude of aberrations; there is no or little performance degradation even when the positional accuracy between the first and second units is low.

Zooming is done as in Example 1, and good focusing performance is achieved by the zooming-out of the second unit G2 alone (FIGS. 12(a) to 12(l)). Simultaneous zooming-in of the first unit G1 contributes to a further improvement in the performance (FIGS. 13(a) to 13(l)).

In Example 3 the lens arrangement comprises, in order from the object side, a first unit G1 consisting of a plastic lens having very weak refracting power, a second unit G2 consisting of a cemented positive lens of a positive and a negative lens, and a third unit G3 consisting of a positive and a negative lens and having negative refracting power; five in all; and two aspherical surfaces are used for the first unit G1 with one aspherical surface for the third unit G3. The first unit G1 consists of a lens with both its surfaces being in aspherical shape and there is a difference in the heights of marginal rays between them, so giving rise to a difference in the aberrations generated. For this reason, there is an increased degree of freedom in correcting aberration by the central part (spherical aberration) and aberrations by the peripheral part (curvature of field, etc.), so that more effective correction for the aberrations can be made. The shapes of both the aspherical surfaces are designed in such a way that their positive refracting powers become strong as they go away from the optical axis.

However, this lens itself gives rise to over curvature of field.

Zooming and focusing occur as in Example 1 (FIGS. 11(a) to 11(l) and 12(a) to 12(l)).

In Example 3 it is understood that the incident surface is convex on the object with some axial distance from the stop, resulting in an increase in the heights of marginal rays and hence an increase in lens diameter. Thus, this lens system offers some problem in connection with size, although there is no problem in connection with the image-forming ability.

In Example 4 the lens arrangement comprises, in order from the object side, a first unit G1 consisting of a plastic lens having very weak refracting power, a second unit G2 consisting of a cemented positive lens of a positive and a negative lens, and a third unit G3 consisting of a positive and a negative lens and having negative refracting power; five in all, and each unit includes an aspherical surface.

Since the second unit G2 includes an aspherical surface as in Example 2, no severe limitation may be on the positional accuracy between the first and second units G1 and G2.

In Example 5 the lens arrangement comprises, in order from the object side, a first unit G1 consisting of a plastic lens having very weak refracting power, a second unit G2 consisting of a negative and a positive lens and having positive refracting power, and a third unit G3 consisting of two lenses, i.e., a positive and a negative lens, and having negative refracting power; six in all, and the first unit G1 includes an aspherical surface.

In Example 6 the lens arrangement comprises, in order from the object side, a first unit G1 consisting of a plastic lens having very weak refracting power, a second unit G2 consisting of a cemented positive lens of a negative and a positive lens, and a third unit G3 consisting of a positive and a negative lens and having negative refracting power; five in all, and each of the first and third units G1 and G3 includes a spherical surface with two aspherical surfaces used for the second unit G2. Since the second unit G2 includes an aspherical surface as in Example 2, no severe limitation may be on the positional accuracy between the first and second units G1 and G2.

In Example 7 the lens arrangement comprises, in order from the object side, a first unit G1 consisting of two plastic lenses, each having very weak refracting power, a second unit G2 consisting of a cemented positive lens of a negative and a positive lens, and a third unit G3 consisting of a positive and a negative lens and having negative refracting power; six in all, and the first unit G1 includes two aspherical surfaces while the third unit G3 includes an aspherical surface. Since there is a difference in the heights of marginal rays between the two aspherical surfaces of the first unit G1 as in Example 6, better correction for aberrations can be made. The two-lens arrangement of the first unit G1 is still advantageous in terms of cost, because both the lenses are made of plastics.

In all the examples, while the first units G1 are described as being made of plastic lenses for the purpose of cost reductions, there is no performance problem, even when they are made of glass lenses.

Set out below are lens data about the lens systems according to the respective examples. Symbols hereinafter used but not hereinbefore have the following meanings: f is the focal length of the overall system, $F_{NO}$ the F-number, $2\omega$ the field angle, $f_B$ the back focus, $r_1$, $r_2$ ... the radii of curvature of the respective lenses, $d_1$, $d_2$ ... the separation between the adjacent lens surfaces, $n_{d1}$, $n_{d2}$ ... the d-line refractive indices of the respective lenses, and $v_{d1}$, $v_{d2}$ ... the Abbe's numbers of the respective lenses. Now let x denote the optical axis direction and y stands for the direction perpendicular to the optical axis. Then, the shape of an aspherical shape is given by $$x=(y^2/r)/[1+\{1-P(y/r)^2\}^{1/2}]+A_4 y^4+A_6 y^6+A_8 y^8+A_{10} y^{10}$$

where r is the paraxial radius of curvature, P is the conical coefficient, and $A_4$, $A_6$, $A_8$, and $A_{10}$ are the aspherical coefficients.

Example 1 f = 39.2 ~ 58.6 ~ 87.1
$F_{NO}$ = 4.66 ~ 6.21 ~ 8.28
$2\omega$ = 56.4° ~ 40.0° ~ 27.7°
$f_B$ = 9.51 ~ 28.13 ~ 55.49

| | | | |
|---|---|---|---|
| $r_1$ = 25.4210(Aspheric) | $d_1$ = 3.000 | $n_{d1}$ = 1.49241 | $v_{d1}$ = 57.66 |
| $r_2$ = 24.5490 | $d_2$ = (Variable) | | |
| $r_3$ = 157.8680 | $d_3$ = 1.500 | $n_{d2}$ = 1.83400 | $v_{d2}$ = 37.16 |
| $r_4$ = 13.6650 | $d_4$ = 9.980 | $n_{d3}$ = 1.69680 | $v_{d3}$ = 55.52 |
| $r_5$ = −17.5900 | $d_5$ = 1.000 | | |
| $r_6$ = ∞ (Stop) | $d_6$ = (Variable) | | |
| $r_7$ = −29.8590 | $d_7$ = 3.000 | $n_{d4}$ = 1.57501 | $v_{d4}$ = 41.49 |
| $r_8$ = −16.2750 | $d_8$ = 3.660 | | |
| $r_9$ = −13.0430(Aspheric) | $d_9$ = 1.800 | $n_{d5}$ = 1.72916 | $v_{d5}$ = 54.68 |
| $r_{10}$ = −640.3870 | | | |

Example 1

Zooming Spaces

| f | 39.2 | 58.6 | 87.1 |
|---|---|---|---|
| $d_2$ | 5.0000 | 47500 | 4.1300 |
| $d_6$ | 14.0200 | 7.2100 | 2.7000 |

Aspherical Coefficients 1 st surface
P = 0.2454
$A_4$ = −0.49968 × $10^{-4}$
$A_6$ = −0.28262 × $10^{-6}$
$A_8$ = −0.12628 × $10^{-8}$
$A_{10}$ = −0.47657 × $10^{-11}$
9 th surface
P = 0.2409
$A_4$ = −0.19743 × $10^{-4}$
$A_6$ = 0.55883 × $10^{-8}$
$A_8$ = −0.12032 × $10^{-8}$
$A_{10}$ = 0.59178 × $10^{-11}$ Example 2 f = 39.1 ~ 59.1 ~ 87.0
$F_{NO}$ = 4.64 ~ 6.15 ~ 8.28
$2\omega$ = 56.8° ~ 39.8° ~ 27.8°
$f_B$ = 9.28 ~ 29.66 ~ 57.96

| | | | |
|---|---|---|---|
| $r_1$ = 129.4710(Aspheric) | $d_1$ = 2.000 | $n_{d1}$ = 1.49241 | $v_{d1}$ = 57.66 |
| $r_2$ = 137.4900 | $d_2$ = (Variable) | | |
| $r_3$ = 37.7490(Aspheric) | $d_3$ = 2.000 | $n_{d2}$ = 1.49241 | $v_{d2}$ = 57.66 |
| $r_4$ = 36.6790 | $d_4$ = 1.420 | | |
| $r_5$ = −119.5760 | $d_5$ = 9.020 | $n_{d3}$ = 1.67270 | $v_{d3}$ = 32.10 |
| $r_6$ = 25.8550 | $d_6$ = 3.830 | $n_{d4}$ = 1.62041 | $v_{d4}$ = 60.27 |
| $r_7$ = −15.3280 | $d_7$ = 1.000 | | |
| $r_8$ = ∞ (Stop) | $d_8$ = (Variable) | | |
| $r_9$ = −30.1720 | $d_9$ = 4.100 | $n_{d5}$ = 1.62004 | $v_{d5}$ = 36.25 |
| $r_{10}$ = −15.3450 | $d_{10}$ = 3.290 | | |
| $r_{11}$ = −11.3270(Aspheric) | $d_{11}$ = 1.800 | $n_{d6}$ = 1.69680 | $v_{d6}$ = 55.52 |
| $r_{12}$ = −142.9020 | | | |

Zooming Spaces

| f | 39.1 | 59.1 | 87.0 |
|---|---|---|---|
| $d_2$ | 3.1100 | 3.1600 | 7.5100 |
| $d_8$ | 15.6100 | 7.9800 | 3.2100 |

Aspherical Coefficients 1 st surface
P = 1.0000
$A_4$ = 0.47463 × $10^{-6}$
$A_6$ = 0.72872 × $10^{-7}$
$A_8$ = −0.36425 × $10^{-9}$
$A_{10}$ = 0
3 rd surface
P = 7.1963
$A_4$ = −0.99201 × $10^{-4}$
$A_6$ = −0.10089 × $10^{-5}$
$A_8$ = 0.53956 × $10^{-8}$
$A_{10}$ = −0.64608 × $10^{-10}$
11 th surface
P = −1.7719
$A_4$ = −0.20403 × $10^{-3}$
$A_6$ = 0.81619 × $10^{-6}$
$A_8$ = −0.43485 × $10^{-8}$
$A_{10}$ = 0.95073 × $10^{-11}$

Example 3

$f = 38.9 \sim 70.2 \sim 101.9$
$F_{NO} = 4.61 \sim 7.52 \sim 9.99$
$2\omega = 57.3° \sim 34.3° \sim 24.0°$
$f_B = 10.60 \sim 42.09 \sim 74.02$

| | | | |
|---|---|---|---|
| $r_1 = -34.6220$(Aspheric) | $d_1 = 5.000$ | $n_{d1} = 1.49241$ | $\nu_{d1} = 57.66$ |
| $r_2 = -37.2550$(Aspheric) | $d_2 =$ (Variable) | | |
| $r_3 = -59.6620$ | $d_3 = 8.010$ | $n_{d2} = 1.51633$ | $\nu_{d2} = 64.15$ |
| $r_4 = -9.2970$ | $d_4 = 1.130$ | $n_{d3} = 1.84666$ | $\nu_{d3} = 23.78$ |
| $r_5 = -11.5560$ | $d_5 = 1.000$ | | |
| $r_6 = \infty$ (Stop) | $d_6 =$ (Variable) | | |
| $r_7 = -57.1080$ | $d_7 = 3.760$ | $n_{d4} = 1.61293$ | $\nu_{d4} = 37.00$ |
| $r_8 = -19.1090$ | $d_8 = 4.160$ | | |
| $r_9 = -12.0390$(Aspheric) | $d_9 = 1.800$ | $n_{d5} = 1.75500$ | $\nu_{d5} = 52.33$ |
| $r_{10} = -304.1050$ | | | |

Zooming Spaces

| f | 38.9 | 70.2 | 101.9 |
|---|---|---|---|
| $d_2$ | 2.4700 | 2.8000 | 2.8000 |
| $d_6$ | 16.0400 | 6.1700 | 2.3500 |

Aspherical coefficients 1 st surface
$P = 1.0000$
$A_4 = 0.65037 \times 10^{-5}$
$A_6 = 0.67721 \times 10^{-6}$
$A_8 = -0.11970 \times 10^{-8}$
$A_{10} = 0$ 2 nd surface
$P = 1.0000$
$A_4 = 0.13326 \times 10^{-3}$
$A_6 = 0.13112 \times 10^{-5}$
$A_8 = 0.12946 \times 10^{-7}$
$A_{10} = 0$ 9 th surface
$P = 0.7782$
$A_4 = 0.25048 \times 10^{-4}$
$A_6 = 0.11094 \times 10^{-6}$
$A_8 = 0.12981 \times 10^{-8}$
$A_{10} = -0.69510 \times 10^{-11}$

Example 4

$f = 36.0 \sim 55.8 \sim 76.5$
$F_{NO} = 4.63 \sim 6.19 \sim 8.26$
$2\omega = 60.8° \sim 42.1° \sim 31.5°$
$f_B = 10.48 \sim 31.73 \sim 53.93$

| | | | |
|---|---|---|---|
| $r_1 = 67.6840$(Aspheric) | $d_1 = 2.000$ | $n_{d1} = 1.49241$ | $\nu_{d1} = 57.66$ |
| $r_2 = 61.6270$ | $d_2 =$ (Variable) | | |
| $r_3 = -34.8290$(Aspheric) | $d_3 = 8.150$ | $n_{d2} = 1.56883$ | $\nu_{d2} = 56.34$ |
| $r_4 = -7.2930$ | $d_4 = 2.380$ | $n_{d3} = 1.76182$ | $\nu_{d3} = 26.52$ |
| $r_5 = -10.5950$ | $d_5 = 1.000$ | | |
| $r_6 = \infty$ (Stop) | $d_6 =$ (Variable) | | |
| $r_7 = -164.3180$ | $d_7 = 2.320$ | $n_{d4} = 1.59551$ | $\nu_{d4} = 39.21$ |
| $r_8 = -34.2860$(Aspheric) | $d_8 = 5.580$ | | |
| $r_9 = -13.4330$ | $d_9 = 1.800$ | $n_{d4} = 1.69350$ | $\nu_{d4} = 53.23$ |
| $r_{10}$ 44509.3797 | | | |

Zooming Spaces

| f | 36.0 | 55.8 | 76.5 |
|---|---|---|---|
| $d_2$ | 4.8300 | 5.5500 | 3.4400 |
| $d_6$ | 13.3100 | 5.4500 | 1.5800 |

Aspherical Coefficients 1 st surface
$P = 1.0000$
$A_4 = -0.13489 \times 10^{-4}$
$A_6 = 0.64043 \times 10^{-7}$
$A_8 = 0.19443 \times 10^{-8}$
$A_{10} = 0$ 3 rd surface
$P = -0.6780$
$A_4 = -0.17571 \times 10^{-3}$
$A_5 = -0.13611 \times 10^{-5}$
$A_8 = -0.36953 \times 10^{-7}$
$A_{10} = 0.45263 \times 10^{-9}$ 8 th surface
$P = -14.4239$
$A_4 = -0.78313 \times 10^{-4}$
$A_6 = 0.13324 \times 10^{-6}$
$A_8 = -0.14315 \times 10^{-8}$
$A_{10} = 0.67894 \times 10^{-11}$

Example 5

$f = 36.2 \sim 55.3 \sim 76.4$
$F_{NO} = 4.70 \sim 6.13 \sim 8.24$
$2\omega = 60.4° \sim 42.3° \sim 31.5°$
$f_B = 8.97 \sim 28.37 \sim 49.87$

| | | | |
|---|---|---|---|
| $r_1 = 21.6080$(Aspheric) | $d_1 = 2.000$ | $n_{d1} = 1.49241$ | $\nu_{d1} = 57.66$ |
| $r_2 = 21.2590$ | $d_2 =$ (Variable) | | |
| $r_3 = 1007.2180$ | $d_3 = 4.960$ | $n_{d2} = 1.69895$ | $\nu_{d2} = 30.12$ |
| $r_4 = 20.2030$ | $d_4 = 1.070$ | | |
| $r_5 = 25.5950$ | $d_5 = 5.230$ | $n_{d3} = 1.67000$ | $\nu_{d3} = 57.33$ |
| $r_6 = -15.3610$ | $d_6 = 1.000$ | | |
| $r_7 = \infty$ (Stop) | $d_7 =$ (Variable) | | |
| $r_8 = -37.6030$ | $d_8 = 2.880$ | $n_{d4} = 1.62004$ | $\nu_{d4} = 36.25$ |
| $r_9 = 16.9550$ | $d_9 = 0.110$ | | |
| $r_{10} = -28.1660$ | $d_{10} = 1.200$ | $n_{d5} = 1.77250$ | $\nu_{d5} = 49.66$ |
| $r_{11} = -56.9180$ | $d_{11} = 3.750$ | | |
| $r_{12} = -14.6170$ | $d_{12} = 1.800$ | $n_{d6} = 1.69680$ | $\nu_{d6} = 55.52$ |
| $r_{13} = -215.5420$ | | | |

Zooming Spaces

| f | 36.2 | 55.3 | 76.4 |
|---|---|---|---|
| $d_2$ | 3.5300 | 2.9300 | 2.2200 |
| $d_7$ | 12.3900 | 5.7700 | 2.2900 |

Aspherical Coefficients 1 st surface
$P = 1.5313$
$A_4 = -0.92894 \times 10^{-4}$
$A_6 = -0.70841 \times 10^{-6}$
$A_8 = -0.73431 \times 10^{-9}$
$A_{10} = -0.22903 \times 10^{-10}$

Example 6

$f = 29.0 \sim 45.6 \sim 67.7$
$F_{NO} = 4.69 \sim 6.18 \sim 8.26$
$2\omega = 72.7° \sim 50.9° \sim 35.5°$
$f_B = 6.44 \sim 22.71 \sim 44.51$

| | | | |
|---|---|---|---|
| $r_1 = -19.0410$(Aspheric) | $d_1 = 2.000$ | $n_{d1} = 1.49241$ | $\nu_{d1} = 57.66$ |
| $r_2 = -20.1480$ | $d_2 =$ (Variable) | | |
| $r_3 = -96.7730$(Aspheric) | $d_3 = 5.850$ | $n_{d2} = 1.75520$ | $\nu_{d2} = 27.51$ |
| $r_4 = 47.5540$ | $d_4 = 7.390$ | $n_{d3} = 1.58913$ | $\nu_{d3} = 61.18$ |
| $r_5 = -11.4450$(Aspheric) | $d_5 = 1.000$ | | |
| $r_6 = \infty$ (Stop) | $d_6 =$ (Variable) | | |
| $r_7 = -37.2850$ | $d_7 = 2.400$ | $n_{d4} = 1.63980$ | $\nu_{d4} = 34.48$ |
| $r_8 = -21.3830$(Aspheric) | $d_8 = 4.580$ | | |
| $r_9 = -10.7740$ | $d_9 = 1.800$ | $n_{d5} = 1.78650$ | $\nu_{d5} = 50.00$ |
| $r_{10} = -75.1320$ | | | |

Zooming Spaces

| f | 29.0 | 45.6 | 67.7 |
|---|---|---|---|
| $d_2$ | 2.3000 | 1.9000 | 3.2000 |
| $d_6$ | 11.8400 | 5.8700 | 2.4400 |

-continued

Aspherical Coefficients 1 st surface
P = 1.0000
$A_4 = 0.24151 \times 10^{-5}$
$A_6 = 0.68851 \times 10^{-6}$
$A_8 = -0.48859 \times 10^{-8}$
$A_{10} = 0$
3 rd surface
P = 41.0051
$A_4 = -0.13598 \times 10^{-3}$
$A_6 = -0.21459 \times 10^{-5}$
$A_8 = 0.16093 \times 10^{-7}$
$A_{10} = -0.24295 \times 10^{-9}$
5 th surface
P = 1.0000
$A_4 = 0.13462 \times 10^{-4}$
$A_6 = 0.24192 \times 10^{-6}$
$A_8 = -0.75276 \times 10^{-9}$
$A_{10} = 0$
8 th surface
P = −5.3465
$A_4 = -0.13278 \times 10^{-3}$
$A_6 = -0.37666 \times 10^{-6}$
$A_8 = 0.13005 \times 10^{-7}$
$A_{10} = -0.15651 \times 10^{-9}$ Example 7

$f = 39.1 \sim 58.8 \sim 86.7$
$F_{NO} = 3.74 \sim 5.61 \sim 8.24$
$2\omega = 57.0° \sim 40.1° \sim 27.9°$
$f_B = 9.41 \sim 29.21 \sim 57.26$

| | | | |
|---|---|---|---|
| $r_1 = 35.3740$(Aspheric) | $d_1 = 2.000$ | $n_{d1} = 1.49241$ | $\nu_{d1} = 57.66$ |
| $r_2 = 34.0270$ | $d_2 = 3.190$ | | |
| $r_3 = -24.8730$ | $d_3 = 2.000$ | $n_{d2} = 1.49241$ | $\nu_{d2} = 57.66$ |
| $r_4 = -24.7720$(Aspheric) | $d_4 = $ (Variable) | | |
| $r_5 = -146.7040$ | $d_5 = 4.120$ | $n_{d3} = 1.80518$ | $\nu_{d3} = 25.43$ |
| $r_6 = 51.1930$ | $d_6 = 5.130$ | $n_{d4} = 1.65830$ | $\nu_{d4} = 57.33$ |
| $r_7 = -16.5940$ | $d_7 = 1.000$ | | |
| $r_8 = \infty$ (Stop) | $d_8 = $ (Variable) | | |
| $r_9 = -44.4300$ | $d_9 = 3.900$ | $n_{d5} = 1.62606$ | $\nu_{d5} = 39.21$ |
| $r_{10} = -19.3240$ | $d_{10} = 4.000$ | | |
| $r_{11} = -13.1620$(Aspheric) | $d_{11} = 1.800$ | $n_{d6} = 1.69680$ | $\nu_{d6} = 55.52$ |
| $r_{12} = 342.7680$ | | | |

Zooming Spaces

| f | 39.1 | 58.8 | 86.7 |
|---|---|---|---|
| $d_4$ | 0.8600 | 0.8500 | 0.5000 |
| $d_8$ | 15.5700 | 7.8100 | 2.8600 |

Aspherical Coefficients 1 st surface
P = −2.5291
$A_4 = -0.53535 \times 10^{-4}$
$A_6 = -0.36823 \times 10^{-6}$
$A_6 = 0.18007 \times 10^{-8}$
$A_{10} = -0.39220 \times 10^{-10}$
4 th surface
P = 1.0000
$A_4 = 0.16946 \times 10^{-4}$ $A_6 = 0.44124 \times 10^{-6}$
$A_8 = -0.10783 \times 10^{-7}$
$A_{10} = 0.11085 \times 10^{-9}$
11 th surface
P = −0.3296
$A_4 = -0.39311 \times 10^{-4}$
$A_6 = -0.76313 \times 10^{-7}$
$A_8 = 0.11467 \times 10^{-8}$
$A_{10} = -0.75329 \times 10^{-11}$ Set out in the following table are the amounts $\Delta G_1$ and $\Delta G_2$ of zooming-out of the first and second units G1 and G2 for focusing in Examples 1–3.

| | WAE | | IFLS | | TE | |
|---|---|---|---|---|---|---|
| Focusing Distance | $\Delta G_1$ | $\Delta G_2$ | $\Delta G_1$ | $\Delta G_2$ | $\Delta G_1$ | $\Delta G_2$ |
| Ex. 1 | | | | | | |
| 1 m (IZO of G1 and G2, FIG. 5) | −0.90 (1) | −0.90 | −0.91 (1) | −0.91 | −0.92 (1) | −0.92 |
| 0.6 m (DZO of G1 and G2, FIG. 6) | −2.01 (1.28) | −1.57 | −2.04 (1.28) | −1.59 | −2.09 (1.28) | −1.64 |
| Ex. 2 | | | | | | |
| 0.6 m (ZO of G1 FIG. 8) | 0.0 (0) | −1.65 | 0.0 (0) | −1.68 | 0.0 (0) | −1.74 |
| 0.6 m (ZI of G1 and ZO of G2, FIG. 9) | 0.82 (−0.5) | −1.65 | 0.84 (−0.5) | −1.68 | 0.87 (−0.5) | −1.74 |
| Ex. 3 | | | | | | |
| 1 m (IZO of G1 and G2, FIG. 11) | −0.92 (1) | −0.92 | −0.94 (1) | −0.94 | −0.98 (1) | −0.98 |
| 0.6 m (DZO of G1 and G2, FIG. 12) | −1.71 (1.05) | −1.63 | −1.78 (1.05) | −1.69 | −1.89 (1.05) | −1.80 |

Abbreviations:
WAE: Wide-angle end
IFLS: Intermediate focal length setting
TE: Telephoto end
IZO: Integral zooming-out
DZO: Independent zooming-out
ZO: Zooming-out
ZI: Zooming-in
Notes:
Symbol − denotes movement toward the object side while + denotes movement toward the image side, and the bracketed figures stand for the ratios between the amounts of movement of the first and second units $G_1$ and $G_2$ (Condition (1)).

Set out in the following table are the values for Conditional Formulae (1), (1'), (2), (3) and (4) in Examples 1 through 7.

| Cond. | Ex. 1 | Ex. 2 | Ex. 3 | Ex. 4 | Ex. 5 | Ex. 6 | Ex. 7 |
|---|---|---|---|---|---|---|---|
| (1) | 1.729 | 1.697 | 1.755 | 1.694 | 1.753 | 1.787 | 1.697 |
| (1') | 1.782 | 1.685 | 1.801 | 1.728 | 1.723 | 1.771 | 1.751 |
| (2) | | | | | | | |
| G2 | 18.36 | 28.17 | 40.37 | 29.82 | 27.21 | 33.67 | 31.90 |
| G3 | 13.19 | 19.27 | 15.33 | 14.02 | 16.34 | 15.52 | 16.31 |

-continued

| Cond. | Ex. 1 | Ex. 2 | Ex. 3 | Ex. 4 | Ex. 5 | Ex. 6 | Ex. 7 |
|---|---|---|---|---|---|---|---|
| (3) | | | | | | | |
| L1 | 0.008 | 0.021 | 0.038 | 0.049 | 0.025 | 0.039 | 0.024 |
| L2 | — | — | — | — | — | — | 0.053 |
| (4) | 0.08 | 0.35 | 0.02 | 0.18 | 0.13 | 0.14 | 0.03 |

Notes:
L1 and L2 denote the object- and image-side lenses in the first unit G1, respectively.

Presented in FIGS. 8(a) to 8(l), 11(a) to 11(l) and 14(a) to 14(l) are aberration diagrams showing the spherical aberration (FIGS. 8(a), 11(a) and 14(a)), astigmatism (FIGS. 8(b), 11(b) and 14(b)), distortion (FIGS. 8(c), 11(c) and 14(c)) and chromatic aberration of magnification (FIGS. 8(d), 11(d) and 14(d)) at the wide-angle ends, the spherical aberration (FIGS. 8(e), 11(e) and 14(e)), astigmatism (FIGS. 8(f), 11(f) and 14(f)), distortion (FIGS. 8(g), 11(g) and 14(g)) and chromatic aberration of magnification (FIGS. 8(h), 11(h) and 14(h)) at the intermediate focal length setting, and the spherical aberration (FIGS. 8(i), 11(i) and 14(i)), astigmatism (FIGS. 8(j), 11(j) and 14(j)), distortion (FIGS. 8(k), 11(k) and 14(k)) and chromatic aberration of magnification (FIGS. 8(l), 11(l) and 14(l)) at the telephoto ends of Examples 1, 2 and 3 during focusing at infinity, respectively. Presented in FIGS. 9(a) to 9(l) are similar aberration diagrams showing of Example 1 wherein the first and second units G1 and G2 are zoomed out together for focusing at 1 m, and presented in FIGS. 10(a) to 10(l) are similar aberration diagrams of Example 1 wherein the first and second units G1 and G2 are independently zoomed out for focusing at 0.6 m. Presented in FIGS. 12(a) to 12(l) are similar aberration diagrams of Example 2 wherein the second unit G2 is zoomed out for focusing at 0.6 m, and presented in FIGS. 13(a) to 13(l) are similar aberration diagrams of Example 2 wherein the first unit G1 is zoomed in and the second unit G2 is zoomed out for focusing at 0.6 m. Presented in FIGS. 15(a) to 15(l) are similar aberration diagrams of Example 3 wherein the first and second units G1 and G2 are zoomed out together for focusing at 1 m, and presented in FIGS. 16(a) to 16(l) are similar aberration diagrams of Example 3 wherein the first and second units G1 and G2 are independently zoomed out for focusing at 0.6 m. Presented in FIGS. 17(a) through 20(l) are similar aberration diagrams of Examples 4 through 7 during focusing at infinity.

As can be seen from the above explanation, the present invention provides a three-unit zoom lens system which, albeit having a zoom ratio exceeding 2, is composed of fewer lenses, is of small and low-cost construction, and shows good-enough performance over the range of infinity to short object distances.

What we claim is;:

1. A three-unit zoom lens system comprising, in order from an object side:
    a first lens unit having weak refracting power, said first lens unit including at least one aspherical surface, and each lens in said first lens unit having a weak refracting power;
    a second lens unit having positive refracting power; and
    a third lens unit having negative refracting power;
    a separation between said first lens unit, said second lens unit, and said third lens unit being varied to vary a focal length of said three-unit zoom lens system;
    said three-unit lens system satisfying the following conditions:

$1.65 < n_N < 1.90$ $|f_T/f_1| < 0.1$ where $n_N$ is a mean value of a refractive index of a negative lens in said third lens unit, $f_T$ is a focal length of said three-unit zoom lens system as a whole at a telephoto end, and $f_1$ is a focal length of each lens in said first lens unit.

2. The three-unit zoom lens system as claimed in claim 1, wherein:
    said first lens unit consists of a single lens.

3. The three-unit zoom lens system as claimed in claim 1 or 2, wherein:
    said second lens unit comprises:
       a negative lens, and
       a positive lens;
    said third lens unit comprises a negative lens; and
    said three-unit zoom lens system satisfies the following condition:

$1.65 < n_{N'} < 1.90$ where $n_{N'}$ is a mean value of refractive indices of said negative lens in said second lens unit and said negative lens in said third lens unit.

4. The three-unit zoom lens system as claimed in claim 1, further comprising:
    an aperture stop located between said second lens unit and said third lens unit.

5. The three-unit zoom lens system as claimed in claim 3, wherein said third lens unit further comprises:
    a positive lens; and
    said three-unit zoom lens system satisfying the following condition:

$|vdP - vdN| > 10$ where vdP is a mean value of an Abbe's number of said positive lens in one of said second lens unit and said third lens unit, and vdN is a mean value of an Abbe's number of said negative lens in one of said second lens unit and said third lens unit.

6. The three-unit zoom lens system as claimed in claim 1, wherein:
    said three-unit zoom lens system satisfies the following condition:

$|\Delta D_1 / \Delta D_2| < 0.5$ where $\Delta D_1$ is a maximum of an amount of change in a first separation between said first lens unit and said second lens unit, and $\Delta D_2$ is a maximum of an amount of change in a second separation between said second lens unit and said third lens unit.

7. The three-unit zoom lens system comprising, in order from an object side:

a first lens unit including at least one aspherical surface, said first lens unit consisting of a single meniscus lens convex on said object side and having a weak refracting power;

a second lens unit having positive refracting power, said second lens unit consisting of a cemented lens of a negative lens and a positive lens; and a third lens unit having negative refracting power, said third lens unit consisting of a separated positive and negative lens combination;

a separation between said first lens unit, said second lens unit, and said third lens unit being varied to vary a focal length of said three-unit zoom lens system;

said three-unit lens system satisfying the following condition:

$$1.65 < n_N < 1.90$$

where $n_N$ is a refractive index of a negative lens in said third lens unit.

8. The three-unit zoom lens system comprising, in order from an object side:

a first lens unit including at least one aspherical surface, said first lens unit consisting of a single meniscus lens convex on said object side and having a weak refracting power;

a second lens unit having positive refracting power, said second lens unit consisting of a single meniscus lens convex on said object side and a cemented lens comprising a positive lens and a negative lens; and a third lens unit having negative refracting power, said third lens unit consisting of a separated positive and negative combination;

a separation between said first lens unit, said second lens unit, and said third lens unit being varied to vary a focal length of said three-unit zoom lens system;

said three-unit lens system satisfying the following condition:

$$1.65 < n_N < 1.90$$

where $n_N$ is a refractive index of a negative lens in said third lens unit.

9. The three-unit zoom lens system comprising, in order from an object side:

a first lens unit including at least one aspherical surface, said first lens unit consisting of a single meniscus lens convex on said object side and having a weak refracting power;

a second lens unit having positive refracting power, said second lens unit consisting of a separated negative and positive lens combination; and a third lens unit having negative refracting power, said third lens unit consisting of a positive lens and two negative lenses;

a separation between said first lens unit, said second lens unit, and said third lens unit being varied to vary a focal length of said three-unit zoom lens system;

said three-unit lens system satisfying the following condition:

$$1.65 < n_N < 1.90$$

where $n_N$ is a mean value of refractive indices of said two negative lenses in said third lens unit.

10. The three-unit zoom lens system comprising, in order from an object side:

a first lens unit including at least one aspherical surface, said first lens unit consisting of a single meniscus lens convex on an image side and having a weak refracting power;

a second lens unit having positive refracting power, said second lens unit consisting of a cemented lens of a negative lens and a positive lens; and a third lens unit having negative refracting power, said third lens unit consisting of a positive lens and a negative lens;

a separation between said first lens unit, said second lens unit, and said third lens unit being varied to vary a focal length of said three-unit zoom lens system;

said three-unit lens system satisfying the following condition:

$$1.65 < n_N < 1.90$$

where $n_N$ is a refractive index of a negative lens in said third lens unit.

11. The three-unit zoom lens system comprising, in order from an object side:

a first lens unit including at least one aspherical surface, said first lens unit having a weak refracting power and consisting of:
a single meniscus lens convex on said object side, and
a single meniscus lens convex on an image side;

a second lens unit having positive refracting power, said second lens unit consisting of a cemented lens of a negative lens and a positive lens; and a third lens unit having negative refracting power, said third lens unit consisting of a positive lens and a negative lens;

a separation between said first lens unit, said second lens unit, and said third lens unit being varied to vary a focal length of said three-unit zoom lens system;

said three-unit lens system satisfying the following condition:

$$1.65 < n_N < 1.90$$

where $n_N$ is a refractive index of a negative lens in said third lens unit.

12. A three-unit zoom lens system comprising, in order from an object side:

a first lens unit having weak refracting power, said first lens unit including at least one aspherical surface, and each lens in said first lens unit having a weak refracting power;

a second lens unit having positive refracting power; and a third lens unit having negative refracting power;

a separation between said first lens unit, said second lens unit, and said third lens unit being varied to vary a focal length of said three-unit zoom lens system; and both said first lens unit and said second lens unit being movable along an optical axis for focusing.

13. The three-unit zoom lens system as claimed in claim 12, wherein:

said first lens unit and said third lens unit remain fixed on said optical axis during focusing.

14. A three-unit zoom lens system according to claim 12, wherein:

both said first lens unit and said second lens unit are integrally movable along an optical axis for focusing.

15. A three-unit zoom lens system according to claim 12, which satisfies the following condition (5):

$$-1 < \Delta G_1/\Delta G_2 < 2 \quad (5)$$

where $\Delta G_1$ is an amount of movement of said first lens unit for focusing, and $\Delta G_2$ is an amount of movement of said second lens unit for focusing.

16. The three-unit zoom lens system as claimed in claim 12, wherein said third lens unit comprises:

a negative lens;

said third lens unit satisfying the following condition:

$$1.65 < n_{N''} < 1.90$$

wherein $n_{N''}$ is a mean value of a refractive index of said negative lens in said third lens unit.

17. A three-unit zoom lens system comprising, in order from an object side:

a first lens unit having weak refracting power;

a second lens unit having positive power; and a third lens unit having negative power, said first lens unit including at least one aspherical surface, and each lens in said first lens unit having a weak refracting power, a separation between said first lens unit, said second lens unit, and a separation between said second lens unit and said third lens unit being varied to vary a focal length of said three-unit zoom lens, said second lens unit being movable along an optical axis for focusing, and said three-unit zoom lens system satisfying the following condition:

$$f_T/f_1 < 0.1$$

where $f_T$ is a focal length of said three-unit zoom lens system at a telephoto end, and $f_1$ is a focal length of each lens in said first lens unit.

18. A three-unit zoom lens system comprising, in order from an object side:

a first lens unit having weak refracting power;

a second lens unit having positive power; and a third lens unit having negative power, said first lens unit including at least one aspherical surface, and each lens in said first lens unit having a weak refracting power, a separation between said first lens unit, said second lens unit, and a separation between said second lens unit and said third lens unit being varied to vary a focal length of said three-unit zoom lens.

said second lens unit being movable along an optical axis for focusing, said three-unit zoom lens system satisfying the following condition:

$$|f_T/f_1| < 0.1$$

where $f_T$ is a focal length of said three-unit zoom lens system at a telephoto end, and $f_1$ is a focal length of each lens in said first lens unit, and said first lens unit and said second lens unit are movable along an optical axis for focusing.

* * * * *